United States Patent
Beaujot

(10) Patent No.: US 12,284,928 B2
(45) Date of Patent: Apr. 29, 2025

(54) IMPLEMENT OPERATING APPARATUS

(71) Applicant: DOT Technology Corp., Emerald Park (CA)

(72) Inventor: Norbert Beaujot, Emerald Park (CA)

(73) Assignee: DOT Technology Corp., Emerald Park (CA)

( * ) Notice: Subject to any disclaimer, the term of this patent is extended or adjusted under 35 U.S.C. 154(b) by 180 days.

(21) Appl. No.: 17/844,910

(22) Filed: Jun. 21, 2022

(65) Prior Publication Data

US 2023/0070398 A1    Mar. 9, 2023

Related U.S. Application Data

(63) Continuation of application No. 16/077,775, filed as application No. PCT/CA2017/050202 on Feb. 16, 2017, now Pat. No. 10,750,652.

(30) Foreign Application Priority Data

Feb. 18, 2016 (CA) .................................. CA 2921130
Jan. 23, 2017 (CA) .................................. CA 2955638

(51) Int. Cl.
  *A01B 51/02* (2006.01)
  *A01B 59/06* (2006.01)
  (Continued)

(52) U.S. Cl.
  CPC .............. *A01B 51/02* (2013.01); *A01B 59/06* (2013.01); *A01B 63/002* (2013.01);
  (Continued)

(58) Field of Classification Search
  CPC ....... A01B 57/02; A01B 59/06; A01B 59/062; A01B 63/002; A01B 63/1006;
  (Continued)

(56) References Cited

U.S. PATENT DOCUMENTS 3,462,199 A   8/1969   Harris et al.
3,472,322 A   10/1969  Barry
(Continued)

FOREIGN PATENT DOCUMENTS

AU   2017220488 A1   9/2018
AU   2021225237      10/2023
(Continued)

OTHER PUBLICATIONS

"Canadian Application Serial No. 2,955,638, Examiner's Report mailed Jan. 25, 2023", 5 pgs.
(Continued)

*Primary Examiner* — Thomas B Will
*Assistant Examiner* — Robert E Pezzuto
(74) *Attorney, Agent, or Firm* — Schwegman Lundberg & Woessner, P.A.

(57) ABSTRACT

An implement operating apparatus has a U-shaped drive frame supported on drive wheels, each pivotally mounted about a vertical wheel pivot axis. A steering control selectively pivots each drive wheel. A power source is connected through a drive control to rotate the drive wheels in either direction. First and second implements are configured to perform implement operations and to rest on the ground and when the drive frame is maneuvered to an implement loading position with respect to each implement, the implement is connectable to the drive frame and movable to an operating position supported by the drive frame. When the implement is in the operating position, the steering and drive controls are operative to move and steer the drive frame and implement along a first travel path or a second travel path oriented generally perpendicular to the first travel path.

33 Claims, 12 Drawing Sheets

(51) Int. Cl.
   *A01B 63/00*   (2006.01)
   *A01B 63/10*   (2006.01)
   *A01B 69/04*   (2006.01)
   *A01B 69/08*   (2006.01)
   *A01B 73/00*   (2006.01)
   *A01B 69/00*   (2006.01)

(52) U.S. Cl.
   CPC ........ *A01B 63/1006* (2013.01); *A01B 69/006* (2013.01); *A01B 69/008* (2013.01); *A01B 73/005* (2013.01); *A01B 69/003* (2013.01)

(58) Field of Classification Search
   CPC ... A01B 69/006; A01B 69/008; A01B 69/003; A01B 73/005; A01B 79/00; A01C 14/00; A01C 21/00; A01D 34/008; A01D 42/00
   See application file for complete search history.

(56) References Cited

U.S. PATENT DOCUMENTS

| | | |
|---|---|---|
| 3,645,074 A | 2/1972 | Rettig et al. |
| 3,757,976 A | 9/1973 | Van der Lely |
| 4,036,377 A | 7/1977 | Weber |
| 4,060,259 A | 11/1977 | Mefferd et al. |
| 4,260,172 A | 4/1981 | Rettig et al. |
| 4,271,919 A | 6/1981 | Vaughan |
| 4,351,428 A | 9/1982 | Long |
| 4,359,117 A | 11/1982 | Vaughan |
| 4,367,814 A | 1/1983 | Young |
| 4,440,539 A | 4/1984 | Sullivan |
| 4,566,553 A | 1/1986 | Mccutcheon |
| 4,603,775 A | 8/1986 | Plett |
| 4,650,058 A | 3/1987 | Vaughan |
| 4,683,969 A | 8/1987 | Littau |
| 4,714,149 A | 12/1987 | Tiede |
| 4,963,066 A | 10/1990 | Boppart |
| 5,092,422 A * | 3/1992 | Hood, Jr. ........... B62D 49/0607 172/306 |
| 5,316,338 A | 5/1994 | Wolf et al. |
| 5,318,444 A | 6/1994 | Kuzub et al. |
| 6,321,852 B1 | 11/2001 | Pratt |
| 6,671,582 B1 | 12/2003 | Hanley |
| 7,191,889 B1 | 3/2007 | Heley |
| 7,488,149 B2 | 2/2009 | Waldner |
| 7,708,131 B2 | 5/2010 | Muth |
| 7,793,770 B1 | 9/2010 | Schoonover et al. |
| 7,866,456 B2 | 1/2011 | Bauman et al. |
| 8,118,151 B1 | 2/2012 | Jesse |
| 8,180,534 B2 | 5/2012 | Burke et al. |
| 8,272,493 B1 | 9/2012 | Grengs |
| 8,312,957 B1 | 11/2012 | Stoltzfus |
| 8,365,896 B2 | 2/2013 | Jesse |
| 8,396,632 B2 | 3/2013 | Burke et al. |
| 8,534,982 B2 | 9/2013 | Brainard et al. |
| 8,584,827 B1 | 11/2013 | Jesse |
| 9,145,264 B2 | 9/2015 | Houssian et al. |
| 9,533,612 B2 | 1/2017 | Meenen et al. |
| 9,596,808 B2 | 3/2017 | Fay, II et al. |
| 9,855,876 B2 | 1/2018 | Affleck |
| 9,932,178 B2 | 4/2018 | Allensworth et al. |
| 10,368,473 B2 | 8/2019 | Treinen et al. |
| 10,407,248 B2 | 9/2019 | Rempel et al. |
| 10,443,251 B2 | 10/2019 | Eenigenburg et al. |
| 10,550,694 B2 | 2/2020 | Watson et al. |
| 10,556,751 B2 | 2/2020 | Peutert et al. |
| 10,750,652 B2 | 8/2020 | Beaujot |
| 10,752,149 B2 | 8/2020 | Beaujot |
| 10,961,728 B2 | 3/2021 | Eenigenburg et al. |
| 11,382,253 B2 | 7/2022 | Beaujot |
| 11,812,678 B2 | 11/2023 | Beaujot |
| 2007/0168095 A1 | 7/2007 | Wierzba et al. |
| 2011/0148053 A1 | 6/2011 | Motebennur et al. |
| 2013/0288692 A1 | 10/2013 | Dupray et al. |
| 2014/0048381 A1 | 2/2014 | Smith et al. |
| 2014/0216314 A1 | 8/2014 | Bourgault et al. |
| 2015/0237803 A1 | 8/2015 | Hilvers et al. |
| 2016/0244268 A1 | 8/2016 | Ritter |
| 2017/0227969 A1 | 8/2017 | Murray et al. |
| 2017/0297471 A1 | 10/2017 | Beaujot |
| 2018/0153084 A1 * | 6/2018 | Calleija ............... A01B 79/005 |
| 2019/0053417 A1 | 2/2019 | Beaujot |
| 2019/0210807 A1 | 7/2019 | Kornelsen et al. |
| 2019/0232852 A1 | 8/2019 | Beaujot |
| 2019/0308830 A1 | 10/2019 | Quist |
| 2021/0051835 A1 | 2/2021 | Beaujot |
| 2021/0070211 A1 | 3/2021 | Beaujot |
| 2021/0185874 A1 | 6/2021 | Beaujot |
| 2023/0389457 A1 | 12/2023 | Beaujot et al. |

FOREIGN PATENT DOCUMENTS

| | | |
|---|---|---|
| CA | 2921130 | 9/2016 |
| CA | 2921130 A1 | 9/2016 |
| CA | 2921130 C | 5/2017 |
| CA | 2927582 | 10/2017 |
| CA | 2927582 A1 | 10/2017 |
| CA | 2964610 A1 | 10/2017 |
| CA | 2955638 | 7/2018 |
| CA | 2955638 A1 | 7/2018 |
| CA | 3052153 A1 | 2/2021 |
| CA | 2964610 | 8/2022 |
| CN | 202573706 U | 12/2012 |
| CN | 109068577 A | 12/2018 |
| DE | 29714523 U1 | 10/1997 |
| EA | 201891745 A1 | 2/2019 |
| EP | 1008284 A2 | 6/2000 |
| EP | 1319587 | 6/2003 |
| EP | 1369007 A1 | 12/2003 |
| EP | 3416469 A1 | 12/2018 |
| IN | 201827034406 A | 2/2019 |
| JP | 2008001273 A | 1/2008 |
| JP | 4553267 B1 | 9/2010 |
| JP | 2010279342 A | 12/2010 |
| JP | 2019510684 A | 4/2019 |
| WO | 9609950 | 4/1996 |
| WO | WO-2017139892 A1 | 8/2017 |
| WO | 2023239807 | 12/2023 |

OTHER PUBLICATIONS

"U.S. Appl. No. 16/935,606, Preliminary Amendment filed Nov. 30, 2020", 8 pgs.

"U.S. Appl. No. 16/935,606, Non Final Office Action mailed Jul. 7, 2021", 9 pgs.

"Canadian Application Serial No. 2,927,582, Office Action mailed Jun. 29, 2021", 11 pgs.

"U.S. Appl. No. 16/935,606, Response filed Nov. 2, 2021 to Non Final Office Action mailed Jul. 7, 2021", 12 pgs.

"Canadian Application Serial No. 2,927,582, Response filed Oct. 27, 2021 Office Action mailed Jun. 29, 2021", 28 pgs.

"U.S. Appl. No. 16/935,606, Notice of Allowance mailed Jan. 21, 2022", 5 pgs.

"U.S. Appl. No. 16/935,606, Notice of Allowance mailed Apr. 26, 2022", 5 pgs.

"U.S. Appl. No. 17/844,910, Preliminary Amendment filed Nov. 29, 2022", 8 pgs.

U.S. Appl. No. 18/330,982, filed Jun. 7, 2023, Implement Operating Apparatus and Methods for Same.

"U.S. Appl. No. 18/330,982, Preliminary Amendment Filed Aug. 22, 2023", 8 pgs.

"U.S. Appl. No. 17/190,877, Notice of Allowability mailed Aug. 30, 2023", 2 pgs.

"International Application Serial No. PCT US2023 024739, International Search Report mailed Sep. 1, 2023", 2 pgs.

"International Application Serial No. PCT US2023 024739, Written Opinion mailed Sep. 1, 2023", 9 pgs.

"Australian Application Serial No. 2021225237, Response filed Sep. 13, 2023 to First Examination Report mailed Jun. 14, 2023", 7 pgs.

(56) References Cited

OTHER PUBLICATIONS

"U.S. Appl. No. 17/190,877, Corrected Notice of Allowability mailed Oct. 13, 2023", 5 pgs.
"Canadian Application Serial No. 2,955,638, Examiners Rule 86(2) Report mailed Jan. 22, 2024", 3 pgs.
"U.S. Appl. No. 17/190,877, Notice of Allowance mailed Jun. 23, 2023", 8 pgs.
"Australian Application Serial No. 2021225237, First Examination Report mailed Jun. 14, 2023", 4 pgs.
"U.S. Appl. 17/190,877, Corrected Notice of Allowability mailed Jul. 6, 2023", 2 pgs.
"Canadian Application Serial No. 2,955,638, Response filed May 25, 2023 to Examiner's Report mailed Jan. 25, 2023", 12 pgs.
"U.S. Appl. No. 17/190,877, Corrected Notice of Allowability mailed Aug. 10, 2023", 2 pgs.
"U.S. Appl. No. 15/490,027, Final Office Action mailed Jan. 14, 2019", 8 pgs.
"U.S. Appl. No. 15/490,027, Non Final Office Action mailed Aug. 9, 2018", 8 pgs.
"U.S. Appl. No. 15/490,027, Response filed Jun. 4, 2018 to Restriction Requirement mailed Apr. 5, 2018", 1 pg.
"U.S. Appl. No. 15/490,027, Response filed Nov. 9, 2018 to Non Final Office Action mailed Aug. 9, 2018", 6 pgs.
"U.S. Appl. No. 15/490,027, Restriction Requirement mailed Apr. 5, 2018", 6 pgs.
"U.S. Appl. No. 16/077,775, Notice of Allowance mailed Apr. 15, 2020", 6 pgs.
"U.S. Appl. No. 16/077,775, Preliminary Amendment filed Aug. 14, 2018", 14 pgs.
"U.S. Appl. No. 16/077,775, Supplemental Notice of Allowability mailed Jun. 12, 2020", 2 pgs.
"U.S. Appl. No. 16/381,201, Notice of Allowance mailed Apr. 22, 2020", 9 pgs.
"U.S. Appl. No. 16/381,201, Preliminary Amendment filed Apr. 11, 2019", 11 pgs.
"U.S. Appl. No. 16/929,814, Non Final Office Action mailed Oct. 6, 2021", 10 pgs.
"U.S. Appl. No. 16/929,814, Notice of Allowance mailed Mar. 11, 2022", 5 pgs.
"U.S. Appl. No. 16/929,814, Preliminary Amendment filed Nov. 12, 2020", 10 pgs.
"U.S. Appl. No. 16/929,814, Response filed Jan. 6, 2022 to Non Final Office Action mailed Oct. 6, 2021", 18 pgs.
"U.S. Appl. No. 17/190,877, Preliminary Amendment filed Mar. 3, 2021", 8 pgs.
"Australian Application Serial No. 2017220488, First Examination Report mailed May 13, 2021" 4 pgs.
"Australian Application Serial No. 2017220488, Response filed Aug. 31, 2021 to First Examination Report mailed May 13, 2021", 17 pgs.
"Brazilian Application Serial No. 11201801675-1, Voluntary Amendment filed Dec. 5, 2019", with machine translation, 137 pgs.
"Brazilian Application Serial No. 112018016785-1, Office Action mailed Jun. 24, 2021", w/English Translation, 5 pgs.
"Brazilian Application Serial No. 112018016785-1, Response filed Sep. 27, 2021 to Office Action mailed Jun. 24, 2021", w/ English translation, 146 pgs.
"Canadian Application Serial No. 2,921,130, Office Action mailed Oct. 26, 2016", 3 pgs.
"Canadian Application Serial No. 2,921,130, Response filed Nov. 17, 2016 to Office Action mailed Oct. 26, 2016", 9 pgs.
"Canadian Application Serial No. 2,964,610, Office Action mailed May 27, 2021", 4 pgs.
"Canadian Application Serial No. 2,964,610, Response filed Sep. 27, 2021 to Office Action mailed May 27, 2021", 12 pgs.
"Chinese Application Serial No. 201780023300.3, Office Action mailed Feb. 2, 2021", with machine translation, 34 pgs.
"Eurasian Application Serial No. 201891745, Office Action mailed Nov. 29, 2019", with English claims, 10 pgs.
"Eurasian Application Serial No. 201891745, Response filed Feb. 14, 2020 to Office Action mailed Nov. 29, 2019", w/English Claims, 25 pgs.
"European Application Serial No. 17752606.8, Extended European Search Report mailed Sep. 23, 2019", 7 pgs.
"European Application Serial No. 17752606.8, Response filed Sep. 28, 2018 to Communication Pursuant to Rules 161(1) and 162 EPC mailed Sep. 25, 2018", 92 pgs.
"European Application Serial No. 17752606.8, Response filed Dec. 4, 2019 to Extended European Search Report mailed Sep. 23, 2019", 92 pgs.
"European Application Serial No. 21161445.8, Extended European Search Report mailed Jun. 28, 2021", 7 pgs.
"Indian Application Serial No. 201827034406, Examination Report mailed Dec. 28, 2020", with English translation, 7 pgs.
"International Application Serial No. PCT/CA2017/050202, International Preliminary Report on Patentability mailed Aug. 30, 2018", 6 pgs.
"International Application Serial No. PCT/CA2017/050202, International Search Report mailed May 19, 2017", 4 pgs.
"International Application Serial No. PCT/CA2017/050202, Invitation to Pay Additional Fees mailed Mar. 7, 2017,", 2 pgs.
"International Application Serial No. PCT/CA2017/050202, Written Opinion mailed May 19, 2017", 4 pgs.
"Japanese Application Serial No. 2018-562394, Notification of Reasons for Refusal mailed Nov. 13, 2020", with machine translation, 10 pgs.
"Japanese Application Serial No. 2018-562394, Response filed Apr. 12, 2012 to Notification of Reasons for Refusal mailed Nov. 13, 2020", w/ English claims, 26 pgs.
Beaujot, Norbert, "Agricultural implement and ramp attachment system", U.S. Appl. No. 15/490,027, filed Apr. 18, 2017, (Apr. 18, 2017), 28 pgs.
U.S. Appl. No. 16/077,775 U.S. Pat. No. 10,750,652, filed Aug. 14, 2018, Implement Operating Apparatus.
U.S. Appl. No. 16/929,814, filed Jul. 15, 2020, Implement Operating Apparatus.
U.S. Appl. No. 17/190,877, filed Mar. 3, 2021, Implement Operating Apparatus.

* cited by examiner

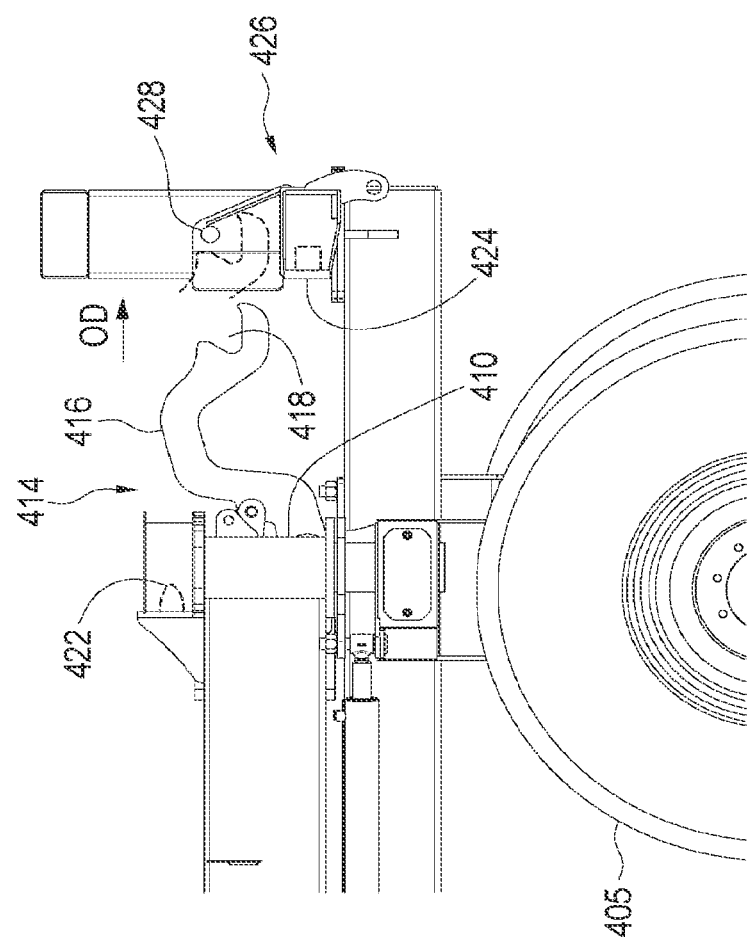

IMPLEMENT OPERATING APPARATUS

This disclosure relates to the field of implements for use in industries such as agriculture, mining, construction and the like, and in particular to a drive apparatus for attachment to a variety of implements for moving the implement in operating and transport modes.

BACKGROUND

Implements such as are used in agriculture and various industries such as mining, road construction and maintenance, and the like include a wide variety of sizes and configurations. Implements such as combines, swathers, sprayers, road graders, earth movers, and the like are commonly self-propelled, with the engine, drive system, and operators station incorporated into the implement itself. Implements such as air seeders, cultivators, discs, grain carts, mowers, and the like are more commonly towed behind a tractor. Some implements are configured to be mounted directly on a tractor instead of being towed behind, such as snowplows mounted on the front end of a tractor, mowers mounted under a middle portion of the tractor, and a wide variety of implements mounted to the arms of a three point hitch system commonly incorporated on the rear end of tractors.

Some self-propelled implements have comprised a drive unit, which includes the engine, drive train, and operator's station, and different implements which can be mounted to the drive unit. For example Versatile Manufacturing Company of Winnipeg, Manitoba, Canada manufactured the Versatile™ 103 which included a drive unit with a swather header and a spraying assembly which were mountable to the drive unit.

Also the advent of very accurate external positioning systems using global positioning satellites (GPS) and the like has more recently led to the development of robotic agricultural vehicles with no operators station. For example recently Amazonen-Werke of Hasbergen, Germany, has developed a robot vehicle for carrying various application modules along a field surface for identifying plants, testing soil compaction, nutrient deficiencies and the like. The robot is controlled by an external guidance system such as using GPS, or by a remote control device. Remote or GPS controlled driverless tractors are also known, such as manufactured by Autonomous Tractor Corporation of Fargo, North Dakota, USA.

See also for example United States Published Patent Application Number 2014/0216314 of Bourgault et al. which discloses a driverless self-propelled air seeder that is guided by a GPS or like external guidance system, and/or by a remote operator.

SUMMARY OF THE INVENTION

The present disclosure provides an implement operating apparatus that overcomes problems in the prior art.

The amount of land farmed by a single farmer has grown steadily for several decades. A successful farm requires timely operations for seeding, chemical application, harvest and the like. As skilled labor has become more difficult to find and more costly, farmers have looked to larger and larger equipment such that seeding equipment is now up to 100 feet wide. While these wide seeders allow a farmer to seed many more acres in a day than with the former narrower seeders, the wide equipment presents many new problems, such as lack of maneuverability in tight quarters, the requirement for sectional control to avoid excessive overlap, correspondingly very large containers for the agricultural products used in the seeding operations to reduce down time for filling, and the like.

Similarly with harvest equipment, present combines have a large capacity and can harvest many hundreds of bushels of grain per hour but the amount of harvested grain they can carry is limited such that it may be required to provide a wagon or the like to empty the combine hopper every ten minutes.

The present disclosure provides an implement operating apparatus that includes a drive frame that carries and operates a variety of implements of a more moderate size. The apparatus can be controlled by a microprocessor connected to an external guidance system using GPS or the like as is known in the art in a robotic unmanned fashion. The drive frame can carry a seeding implement at seeding time, then a spraying implement to spray crops, then a grain cart, large conveyor, or the like at harvest time.

The presently disclosed apparatus can include an operator's station, or can be controlled by an external guidance system and/or remote control. A single operator can thus control a plurality seeding implements for example, and each seeding implement can have a more manageable width, such as 20-30 feet instead of three times that.

In a first embodiment the present disclosure provides a U-shaped drive frame comprising a base beam and first and second substantially parallel side beams extending from corresponding first and second ends of the base beam and defining an open implement area between outer ends of the first and second side beams. The drive frame is supported on a plurality of drive wheels for travel on a ground surface and each drive wheel is pivotally mounted to the drive frame about a substantially vertical wheel pivot axis A steering control is operative to selectively pivot each drive wheel about the corresponding wheel pivot axis. A power source is mounted on the drive frame and connected through a drive control to rotate each drive wheel and the drive control is operative to rotate the drive wheels in a selected one of first and second directions. First and second implements are configured to perform an implement operation and to rest on the ground surface when in an idle position. Each implement and the drive frame are configured such that when the drive frame is maneuvered to an implement loading position with respect to each implement in the idle position, each implement is connectable to the drive frame and movable to an operating position where each implement is supported by the drive frame and is connected to an implement control system operative to control implement functions. When the drive frame is in the implement loading position with respect to the first implement in the idle position, at least a portion of the first implement is between and above the first and second side beams. When each implement is in the operating position, the steering and drive controls are operative in a first mode to move and steer the drive frame and supported implement along a first travel path and the steering and drive controls are operative in a second mode to move and steer the drive frame and supported implement along a second travel path oriented generally perpendicular to the first travel path.

In a second embodiment the present disclosure provides an agricultural implement apparatus comprising a U-shaped foundation frame supported on wheels for travel over a ground surface where the foundation frame includes right and left substantially parallel and laterally spaced mounting beams fixed at inner ends thereof to a substantially horizontal base beam and extending in an outward direction from the base beam to outer ends thereof remote from the base beam such that an open implement area is provided between the mounting beams from the outer ends of the mounting beams to the base beam. An implement is configured to perform an implement operation, to rest on the ground surface when in an idle position, and to attach to the foundation frame in the open implement area when in an operating position. A plurality of beam attachment mechanisms is mounted to the foundation frame, each beam attachment mechanism comprising a lift arm pivotally attached at an inner end thereof to the corresponding beam and defining a hook at an outer end thereof, wherein the lift arm is pivotable from a loading position extending in the outward direction to an operating position extending upward, a hydraulic cylinder operative to pivot the lift arm between the loading position and the operating position, and a beam engagement member. For each beam attachment mechanism, a corresponding implement attachment mechanism is mounted to the implement, each implement attachment mechanism comprising a shaft oriented substantially horizontally, and an implement engagement member. The attachment mechanisms are configured such that, with the lift arms in the loading position, the foundation frame is movable to an implement loading position with respect to the implement in the idle position where the hook of each beam attachment mechanism is located under the shaft of the corresponding implement attachment mechanism such that pivoting the lift arms to the operating position moves the implement upward and in an inward direction such that each implement engagement member moves into engagement with the corresponding beam engagement member.

In a third embodiment the present disclosure provides a method of performing first and second implement operations. The method comprises mounting a drive frame on a plurality of drive wheels, each drive wheel pivotally attached to the drive frame about a substantially vertical wheel pivot axis; providing a steering control operative to selectively pivot each drive wheel about the corresponding wheel pivot axis; mounting a power source on the drive frame and connecting the power source through a drive control to rotate each drive wheel, the drive control operative to selectively rotate the drive wheels in first and second directions; operating the drive control and steering control in a first mode to move and steer the drive frame along a first travel path and operating the drive control and steering control in a second mode to move and steer the drive frame along a second travel path oriented generally perpendicular to the first travel path; supporting a first implement configured to perform the first implement operation on a ground surface in a first idle position; supporting a second implement configured to perform the second implement operation on a ground surface in a second idle position; operating the drive control and steering control in one of the first and second modes to move and steer the drive frame to an implement loading position with respect to the first implement in the first idle position; connecting the first implement to the drive frame and moving the first implement to an operating position supported by the drive frame; connecting the first implement to an implement control system operative to control implement functions; operating the steering and drive controls in the first mode to move and steer the drive frame and first implement along the first travel path and operating the implement control system to control the implement functions of the first implement to perform the first implement operation; operating the drive control and steering control in one of the first and second modes to move and steer the drive frame to a storage location and moving the first implement to the first idle position and disconnecting the first implement from the drive frame and the implement control system; operating the drive control and steering control in one of the first and second modes to move and steer the drive frame to an implement loading position with respect to the second implement in the second idle position; connecting the second implement to the drive frame and moving the second implement to an operating position supported by the drive frame; connecting the second implement to the implement control system to control implement functions; operating the steering and drive controls in the second mode to move and steer the drive frame and second implement along the second travel path and operating the implement control system to control the implement functions of the second implement to perform the second implement operation.

A variety of implements can be used with the present apparatus to operate in either direction along either of the first and second travel paths, Such implements include a wide range including seeding implements, chemical application implements, grain carts, crop swathers, land packers, earth moving equipment, and cutters such as are used in agricultural, construction, mining, and like industries. Efficiency is improved as at least some of the weight of the implement is supported by the drive wheels providing ballast such that the drive frame can be lighter and there will still be sufficient weight on the drive wheels to provide the necessary traction. Thus the total amount of weight moved by the power source is reduced. Travel can be in either direction along a first path or perpendicular along a second path. This feature allows an implement to be operated in a wide orientation along one path to cover significant ground area during operation, and then moved in a narrow orientation along the second perpendicular path for transport.

With a power source such as an internal combustion motor of 70-150 horsepower and drive frame dimensions of 10-12 feet or more square, or a rectangular drive frame of 10-12 feet by 15-20 feet, implements suitable for large farming operations can be used, such as seeding implements with a width of 25-30 feet, grain carts with a capacity of 500 bushels, spraying equipment with a width of 60-80 feet. Other larger implements such as 100 foot long grain conveyors are also well suited to use as the ability to move in either of the two paths is convenient for moving from bin to bin, and for moving into position under hopper bottom trailers. Tillage and like land working implements are similarly well suited.

With the robotic controls presently available a single operator can supply necessary fertilizer and seed to a fleet of three, four, or more seeding implements for example and monitor the operations of all implements. Similarly the robotic controls can be used to move a plurality of grain carts between a plurality of combines and transport vehicles during harvest.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 33 is a side view of a beam attachment mechanism mounted on a beam of the foundation frame approaching the implement loading position of FIG. 12 with respect to a corresponding implement attachment mechanism mounted on the implement;

Figure 16:
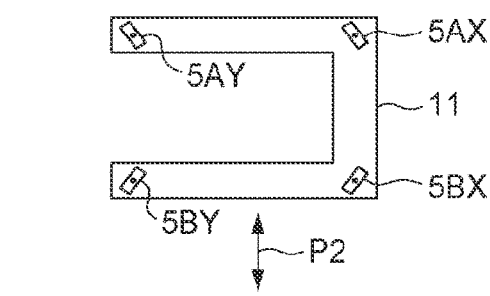
FIG. 16 is a schematic top view of a the drive frame shown in FIG. 15 with the second pair of drive wheels pivoted in a tight turn direction with respect to the first pair of drive wheels.
Figure 37:
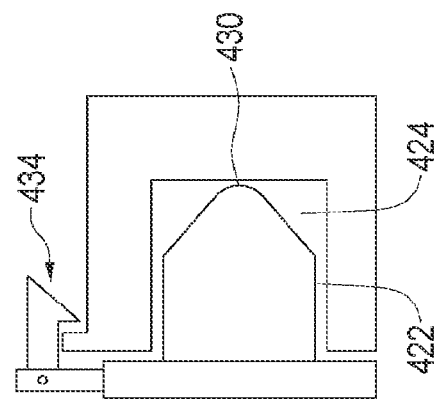
Figure 36:
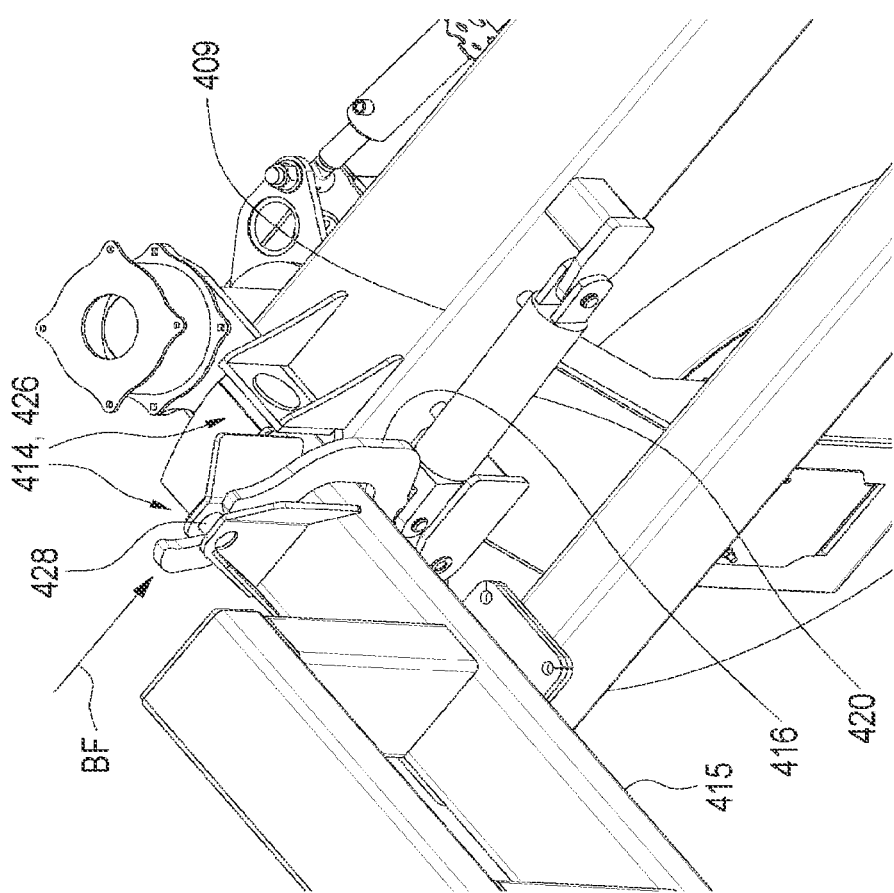
Figure 38:
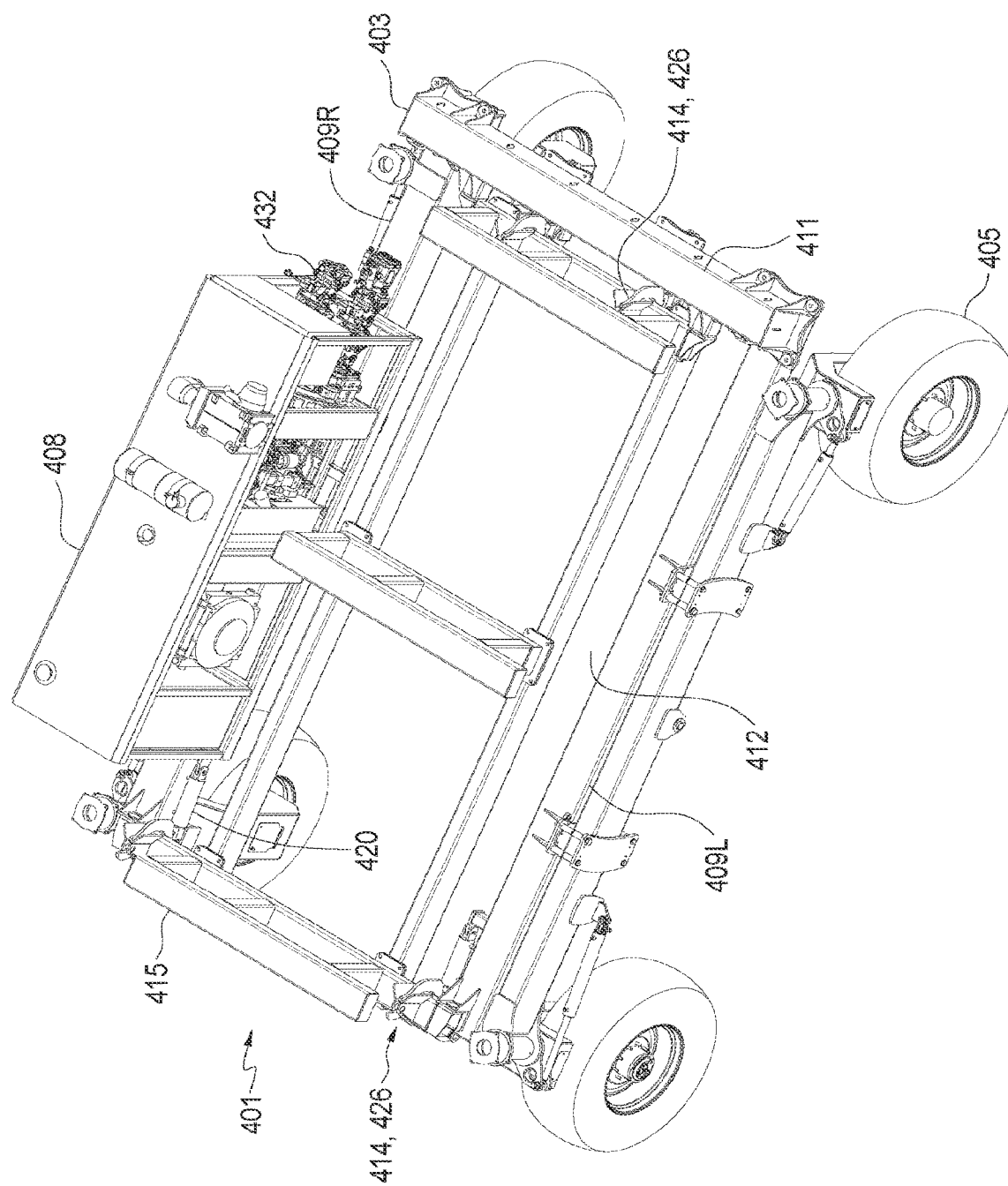

FIG. 36 is a top perspective view of the hook of the lift arm of the beam attachment mechanism located under the shaft of the corresponding implement attachment mechanism as shown in FIG. 16 but with the lift arm fully raised to the operating position;

FIG. 37 is a schematic cut away side view of a lock mechanism operative to maintain the engagement of the beam and implement engagement members;

FIG. 38 is as top perspective view of the implement mounted to the foundation frame by the corresponding beam and implement attachment mechanisms.

DETAILED DESCRIPTION OF THE ILLUSTRATED EMBODIMENTS

FIGS. 1-6 schematically illustrate an embodiment of an implement operating apparatus 1 of the present disclosure comprising a U-shaped drive frame 3 supported on a plurality of drive wheels 5 for travel on a ground surface 7. Each drive wheel 5 is pivotally mounted about a substantially vertical wheel pivot axis WA, and a steering control 9 is operative to selectively pivot each drive wheel 5 about the corresponding wheel pivot axis WA. It is contemplated that the drive wheels 5 could be incorporated into a track assembly as is known in the art, where the wheel pivot axis extends upward from substantially a center of the ground/track/interface. Thus the term "drive wheel" as used herein includes all such drive wheel assemblies.

In the illustrated apparatus 1 the drive frame includes a base beam 11 and first and second substantially parallel side beams 13A, 13B extending outward from corresponding first and second ends of the base beam 11 to define an open implement area between outer ends of the first and second side beams 13A, 13B. A first pair of drive wheels 5A supports the first side beam 13A and a second pair of drive wheels 5B supports the second side beam 13B.

Figure 1:
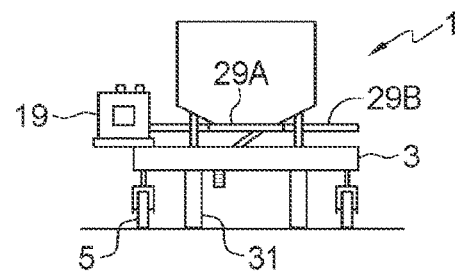
FIG. 1 is a schematic end view of an embodiment of the implement operating apparatus of the present disclosure with the drive frame aligned with the implement, schematically illustrated as a seeding implement, and ready to move to the implement loading position.
Figure 2:
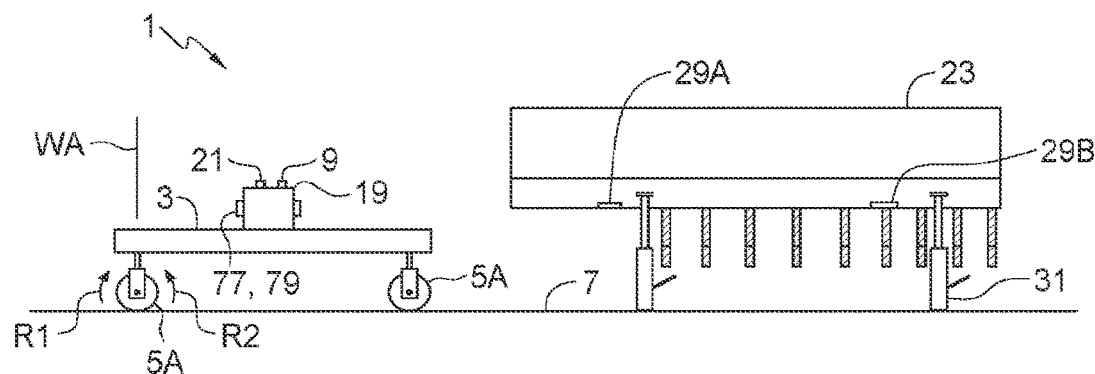
FIG. 2 is a schematic side view of the embodiment of FIG. 1 in the same position as shown in FIG. 1.

A power source is mounted on the drive frame 3 and is connected through a drive control 21 to rotate each drive wheel 5, and the drive control 21 is operative to rotate the drive wheels 5 in a selected one of first and second directions R1, R2 as shown in FIG. 2. In the apparatus 1 the power source is an internal combustion motor 19 mounted on the second side beam 13B in an offset position such that the inner side of the second side beam 13B is between the motor 19 and the first side beam 13A, leaving maximum clearance between the side beams 13. It is contemplated that the power source can also be provided by a plurality of batteries providing electrical power to drive and steer and provide necessary power for various other functions.

Figure 3:
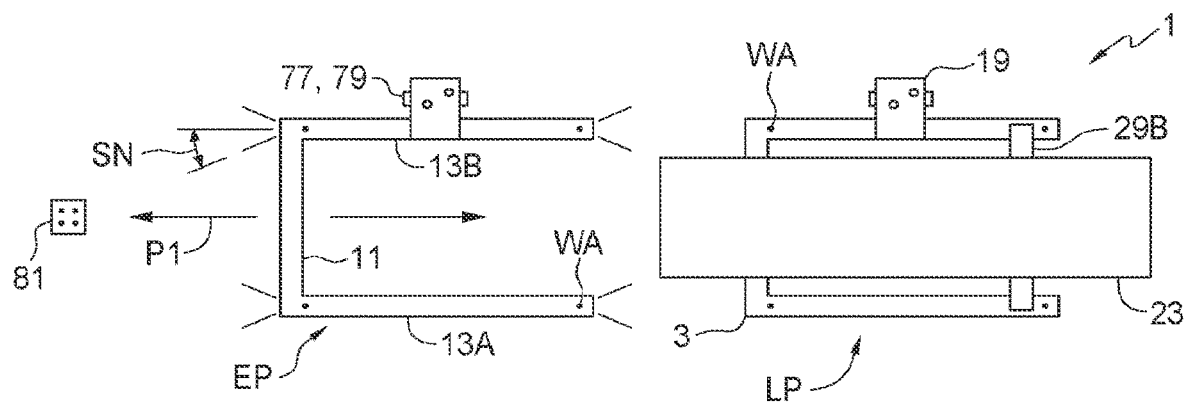
FIG. 3 is a schematic top view of the embodiment of FIG. 1 with the drive frame moved along path P1 from the empty position shown in FIG. 1 on the left side of the drawing to the implement loading position shown on the right.
Figure 4:
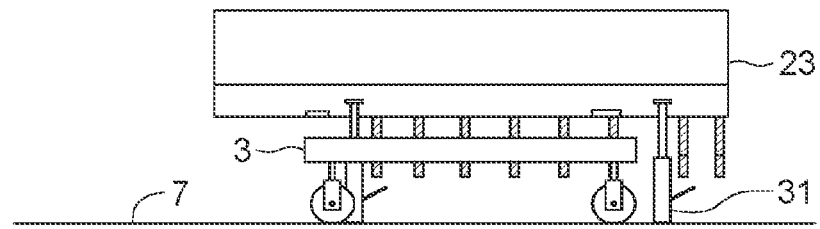
FIG. 4 is a schematic side view of the embodiment of FIG. 1 with the drive frame in the implement loading position.
Figure 5:
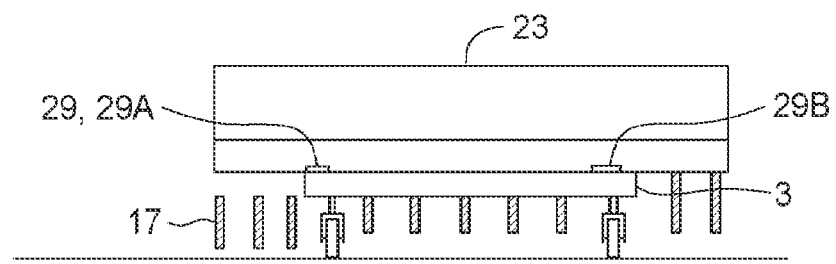
FIG. 5 is a schematic side view of the embodiment of FIG. 1 with the implement lowered to the operating position supported on the drive frame and with supporting actuators removed or retracted, and showing additional ground working tools in position for installation on the end of the implement extending over the base beam.

Also forming a part of the apparatus 1 is an implement 23 configured to rest on the ground surface 7 when in an idle position shown in FIGS. 1-4. The implement 23 and drive frame 3 are configured such that when the drive frame 3 is maneuvered as schematically illustrated in FIG. 3, from the empty position EP to the implement loading position LP with respect to the implement 23 in the idle position, the implement 23 is connectable to the drive frame 3 and movable to the operating position shown in FIGS. 5 and 6 where the implement 23 is supported by the drive frame 3 and is connected to an implement control system 25 that is operative to control implement functions. In the apparatus 1, additional ground working tools 17 or the like are installed after the implement 23 is in the operating position as shown in FIG. 5. The implement 23 may be any of a variety of implements used in agricultural, mining, construction, and like industries, and is maintained in the idle position on the ground by stands, props, or other supports as may be required.

Figure 6:
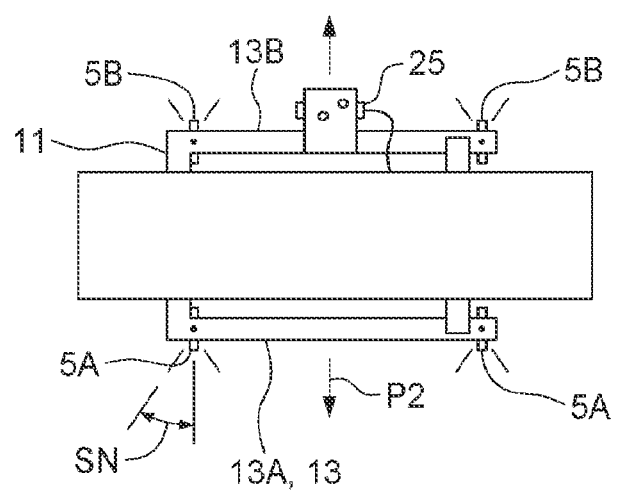
FIG. 6 is a schematic top view of the embodiment of FIG. 1 with the implement in the operating position of FIG. 5 and the drive wheels turned from the position shown in FIG. 4 and oriented to follow path P2 perpendicular to the side beams.

When the implement 23 is in the operating position, the steering and drive controls 9, 21 are operative in a first mode to move and steer the drive frame 3 and implement along a first travel path P1 shown in FIG. 3, and are operative in a second mode to move and steer the drive frame 3 and implement 23 along a second travel path P2 oriented generally perpendicular to the first travel path P1 as shown in FIG. 6. In FIGS. 1-4 the wheels 5 are shown oriented to follow path P1 to move the drive frame 3 to the implement loading position under the implement 23. Once in the implement loading position of FIG. 4 the wheels are rotated to the position shown in FIG. 5 oriented to travel along path P2.

In order to travel in a straight line along both paths P1 and P2 the wheels 5 need to pivot only 90 degrees, however in order to actually steer the apparatus 1 along either path the wheels 5 need to pivot through a steering angle range SN of at least about 20 degrees either side of the path.

Figure 7:
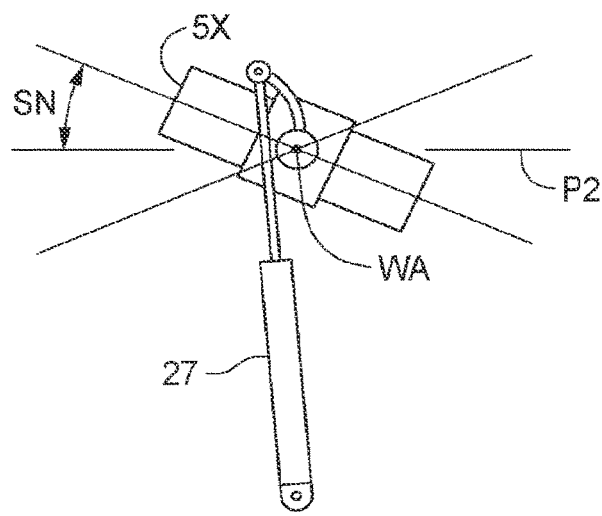
FIG. 7 is a schematic top view showing the configuration of a drive wheel and corresponding steering hydraulic cylinder with the wheel oriented at the end of the steering angle range for travel along path P2.
Figure 8:
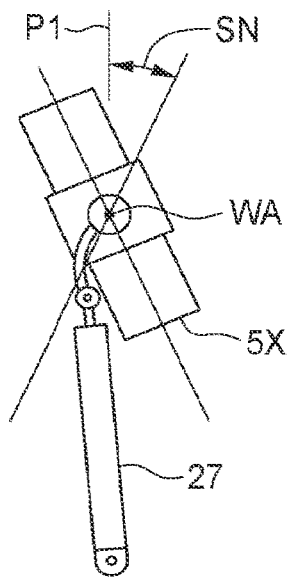
FIG. 8 is a schematic top view showing the configuration of the drive wheel and corresponding steering hydraulic cylinder of FIG. 7 with the wheel pivoted about the vertical wheel axis through about 130 degrees to the end of the steering angle range for travel along path P1.
Figure 9:
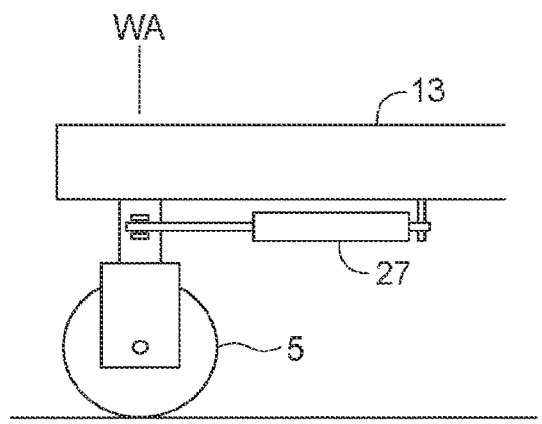
FIG. 9 is a schematic side view of the drive wheel and corresponding steering hydraulic cylinder of FIGS. 7 and 8 mounted in position on the drive frame.

Since the wheels 5 can be rotated in either direction R1, R2 each wheel 5 is only required to pivot about its wheel pivot axis WA through an angle of about 130 degrees, or for greater steering range through 135 degrees as shown by the position of the wheel edge 5X at one end of the range in FIG. 7 and the position of the same wheel edge 5X at the opposite end of the range in FIG. 8. The steering control 9 then can conveniently comprise a hydraulic cylinder 27 mounted under the side beams 13 adjacent to each drive wheel 5 as schematically illustrated in FIG. 9 and operative to selectively pivot the corresponding drive wheel 5 about the corresponding wheel pivot axis WA through a pivot range greater than about 130 degrees.

The illustrated implement 23 is higher than the drive frame 3 when in the idle position. The open end of the drive frame 3 can be maneuvered along path P1 to the implement loading position where a portion of the implement 23 is between and above the first and second side beams 13. The height of the implement 23 does not interfere with moving the drive frame 3 to the implement loading position shown in FIG. 4, in which position a connecting portion of the implement 23, comprising tie beams 29A, 29B, is above the drive frame 3, and support actuators 31 are operative to lower the tie beams 29 to rest on the drive frame 3. The support actuators 31, such as jacks or the like, are then removed or retracted and the implement 23 is supported on the drive frame 3 in the operating position as shown in FIG. 5 with the implement control system 25 connected, and with the tie beam 29B connected to the side beams 13 and the tie beam 29A connected to the base beam 11, with bolts or like fasteners.

Figure 10:
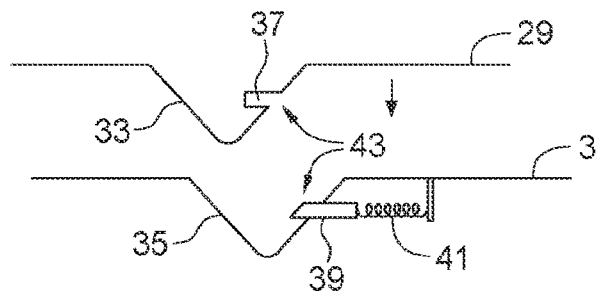
FIG. 10 is a schematic cut away side view of a conical centering arrangement and latching mechanism for connecting the implement to the drive frame.

As schematically illustrated in FIG. 10, correct alignment of the tie beams 29, and thus the implement 23, with the drive frame 3 can be facilitated by providing conical projections 33 on tie beams 29 and corresponding conical recesses 35 on the drive frame 3 such that as the tie beams 29 are lowered and the conical projection 33 enters an edge of the conical recess 35, further downward movement will force the conical projection and recess 33, 35 into full engagement in the correct alignment. Further to more quickly connect the implement 23 to the drive frame 3, a lock recess 37 can be provided in the conical projection 33 configured to receive a lock member 39 that is biased by a spring 41 or the like when the conical projection and recess 33, 35 are fully engaged. The lock mechanism 43 provided by the recess, 37, lock member 39, and spring 41 is convenient and other lock mechanisms and fasteners as known in the art can also be used to connect the implement to the drive frame.

The illustrated implement 23, when in the operating position of FIGS. 5 and 6, extends outward beyond the base beam 11 at one end and outward beyond outer ends of the first and second side beams 13A, 13B remote from the base beam 11. The side beams 13 have a length greater than the length of the base beam 11 such that the drive frame is rectangular with a narrow dimension generally equal to the length of the base beam 11 and a long dimension equal to the length of the side beams 13. This configuration is beneficial in that the long dimension provides stable support of lengthy implements such as the illustrated implement 23, which can for example be a seeding implement, where the implement operation is performed when the implement 23 moves in an operating direction along travel path P2 generally perpendicular to the side beams 13, and also provides a narrow transport width when moving along roads and the like on path P1 oriented generally parallel to the side beams 13.

Because the side beams 13 can extend a considerable distance from the base beam 11, in order to secure the side beams 13A, 13B in a relatively rigid relationship and reduce stress on the connection between the side beams 13 and base beam 11, it is beneficial to provide an end beam releasably attached at first and second ends thereof to outer end portions of the first and second side beams 13 remote from the base beam 11.

In the illustrated apparatus 1 the end beam is provided by the tie beam 29B fixed to the implement 23 that is releasably attached to the first and second side beams 13A, 13B only when the implement 23 is in the operating position. Thus for example with the conical recess 35 and the lock member 39 and spring 41 of the lock mechanism 43 schematically illustrated in FIG. 10 mounted on outer end portions of each of the first and second side beams 13, and the corresponding conical projection 33 and lock recess 37 mounted on corresponding ends of the tie beam 29B, the implement engages the lock mechanisms 43 when the implement 23 is in the operating position, such that the side beams 13 are substantially fixed with respect to the implement 23, and thus with respect to each other, when the implement 23 is in the operating position.

When the implement 23 is again moved to its idle position, the end of the drive frame 3 is open and the drive frame 3 is free to maneuver to load other implements. Where no implement is supported on the drive frame 3, or when the drive frame supports certain implements where operation thereof does not exert significant forces on the connection between the side beams 13 and base beam 11, the end beam is not typically required.

Figure 11:
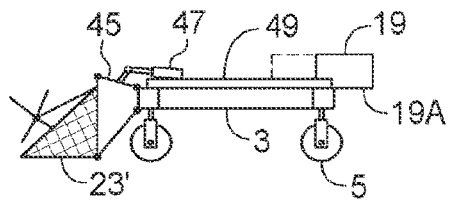
FIG. 11 is a schematic side view of the drive frame of the embodiment of FIG. 1 in the loading position beside an different implement, schematically illustrated as a swather, and with connecting arms connected between the implement and the drive frame such that the implement is also in the operating position.
Figure 12:
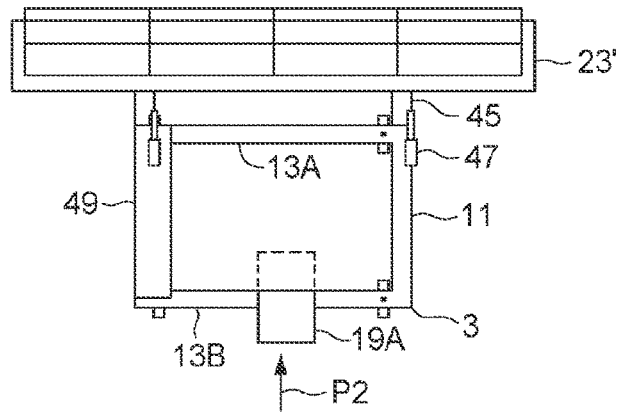
FIG. 12 is a schematic top view of the drive frame and implement as shown in FIG. 11.

FIGS. 11-14 schematically illustrate the drive frame 3 in use with a different implement 23' where the implement 23' is beside the drive frame 3 adjacent to the first side beam 13A when the drive frame 3 is in the implement loading position shown in FIGS. 11 and 12, and the motor 19 is mounted on the second side beam 13B. With the implement 23' the drive frame can be maneuvered to the loading position along either path P1 parallel to the side beams or path P2 perpendicular to the side beams 13.

The implement 23' is schematically illustrated as a swather header which like the seeding implement 23 extends beyond each end of the drive frame 3. Here the implement 23' is connected to the drive frame 3 by movable raising arms 45 attachable to the implement and the drive frame, and actuator 47 operative to move the raising arms 45 to move the implement to the operating position. With a swather header the operating position is typically located in a range from the illustrated position where the implement 23' is touching the ground, essentially the same as the idle position shown in FIGS. 11 and 12, to an elevated position suited to cutting a particular crop.

An end beam 49 is releasably attached between the outer end portions of the first and second side beams 13A, 13B to secure the side beams 13A, 13B in a relatively rigid relationship, and also to provide a mounting location for the various raising arms 45, actuators 47, and the like that may be required. The implement 23' is operated in a field operation by moving the drive frame 3 and implement 23' along the second travel path P2 in the direction of the arrow in FIG. 12 with the implement 23 in an operating location forward of the drive frame 3.

Figure 13:
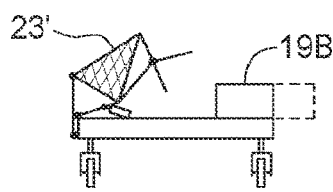
FIG. 13 is a schematic side view of the drive frame and implement of FIG. 11 with the implement in the transport position.
Figure 14:
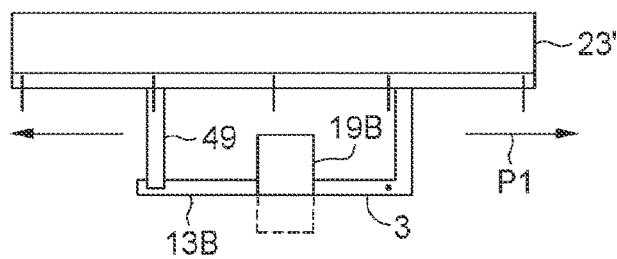
FIG. 14 is a schematic top view of the drive frame and implement in the transport position as shown in FIG. 13.

The implement 23' is movable from the operating location beside the first side beam 13A shown in FIGS. 11 and 12 to a transport location above the drive frame 3 as shown in FIGS. 13 and 14. The motor 19 is movable from a first motor operating position 19A shown in FIGS. 11 and 12, to a second motor operating position 19B shown in FIGS. 13 and 14. In the position 19A the motor is moved outward with respect to the drive frame 3 in a direction opposite the location of the implement 23' to counterbalance the implement 23' and provide improved stability.

Once the implement 23' is moved to the transport location above the drive frame 3, the counterbalance is not required and the motor can be moved to position 19B for transport along the first travel path P1 The implement 23' and drive frame 3 can then be transported along a road in a narrow configuration substantially equal to the length of the base beam 11 by moving the drive frame 3 and implement 23' along the first travel path P1.

Figure 15:
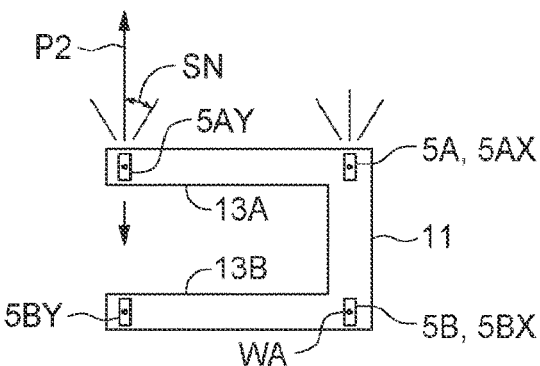
FIG. 15 is a schematic top view of the drive frame of the embodiment of FIG. 1 with the first pair of drive wheels under the first side beam steering together through the steering angle range along path P2 and the second pair of drive wheels under the second side beam fixed to roll in alignment with path P2.
Figure 17:
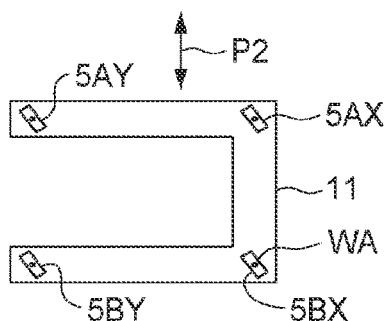
FIG. 17 is a schematic top view of a the drive frame shown in FIG. 15 with the second pair of drive wheels pivoted in a crab steer direction with respect to the first pair of drive wheels.

As best seen in FIGS. 15-17 the first pair of drive wheels 5A supporting the first side beam 13A includes a first base drive wheel 5AX proximate to the base beam 11, and a first end drive wheel 5AY remote from the base beam 11. The second pair of drive wheels 5B supporting the second side beam 13B includes a second base drive wheel 5BX proximate to the base beam 11, and a second end drive wheel 5BY remote from the base beam 11.

When moving and steering the drive frame 3 and any implement attached thereto along the second travel path P2, the steering control is operative to pivot the first base and end drive wheels drive wheels 5AX, 5AY together in the same direction through the steering angle range SN of at least about 20 degrees either side of the path P2 as shown in FIG. 15.

When moving and steering the drive frame and implement along the second travel path P2, the steering control can pivot only the first base and end drive wheels drive wheels 5AX, 5AY and maintain the second base and end drive wheels 5BX, 5BY aligned with the second travel path P2 as shown in FIG. 15. The steering control can also be configured to pivot the second base and end drive wheels 5BX, 5BY together about the corresponding wheel pivot axes WA in one of a tight turn direction shown in FIG. 16, opposite the direction of pivoting of the first base and end drive wheels 5AX, 5AY, and a crab steer direction shown in FIG. 17, the same as the direction of pivoting of the first base and end drive wheels 5AX, 5AY.

Figure 18:
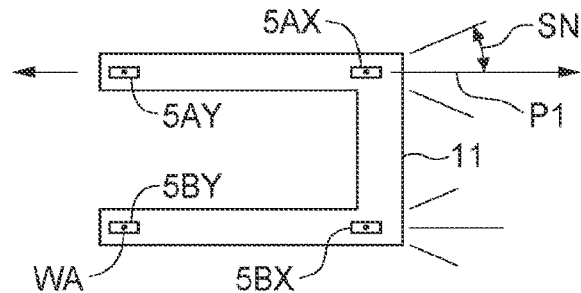
FIG. 18 is a schematic top view of the drive frame of the embodiment of FIG. 1 with the first and second base drive wheels under the base beam steering together through the steering angle range along path P1 and the first and second end drive wheels under the remote ends of the side beams fixed to roll in alignment with path P1.

Similarly when moving and steering the drive frame 3 and any implement attached thereto along the first travel path P1, the steering control is operative to pivot the first and second base drive wheels 5AX, 5BX together in the same direction through the steering angle range SN of at least about 20 degrees either side of the path P1 as shown in FIG. 18.

Figure 19:
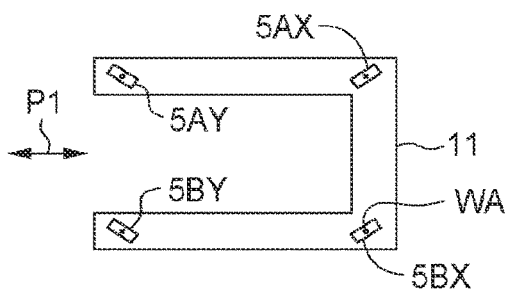
FIG. 19 is a schematic top view of the drive frame shown in FIG. 18 with the first and second end drive wheels pivoted in a tight turn direction with respect to the first pair of drive wheels.
Figure 20:
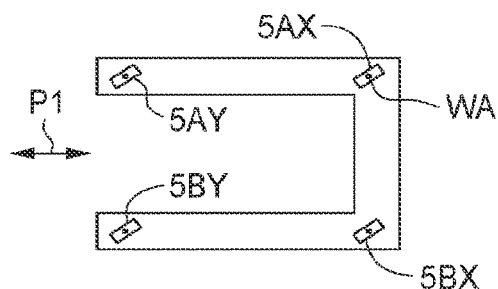
FIG. 20 is a schematic top view of the drive frame shown in FIG. 18 with the first and second end drive wheels pivoted in a crab steer direction with respect to the first pair of drive wheels.

Again when moving and steering the drive frame and implement along the first travel path P1, the steering control can pivot only the first and second base drive wheels 5AX, 5BX and maintain the first and second end drive wheels drive wheels 5AY, 5BY aligned with the first travel path P1 as shown in FIG. 18. The steering control can also be configured to pivot the first and second end drive wheels drive wheels 5AY, 5BY together about the corresponding wheel pivot axes WA in one of a tight turn direction shown in FIG. 19, opposite the direction of pivoting of the first and second base drive wheels 5AX, 5BX, and a crab steer direction shown in FIG. 20, the same as the direction of pivoting of the first and second base drive wheels 5AX, 5BX.

In a typical apparatus 1 the steering control 9 can be configured to maintain the drive wheels 5 at any selected common steering angle, depending on the path being followed. The drive frame 3 can thus be oriented at an angle during travel if desired, such as to correct skewing of the implement on sloping terrain, however steering will be limited in one direction because of the limited range of pivoting about the wheel axes WA.

The illustrated wheels 5 are located at the corners of a rectangle as in a conventional vehicle such that steering along either path P1 or P2 is conventional. The steering control 9 can also be connected to the drive control 21 and operative to adjust a relative rotational speed of the drive wheels 5 to steer the drive frame 3 in a manner similar to steering tracked vehicles. Thus when travelling along path P1 as shown in FIG. 18, the steering control can slow the rotational speed of the wheels 5AX, 5AY with respect to the rotational speed of the wheels 5BX, 5BY to turn the drive frame. Similarly when travelling along path P2 as shown in FIG. 15, the steering control can slow the rotational speed of the wheels 5AX, 5BX with respect to the rotational speed of the wheels 5AY, 5BY to turn the drive frame.

Figure 21:
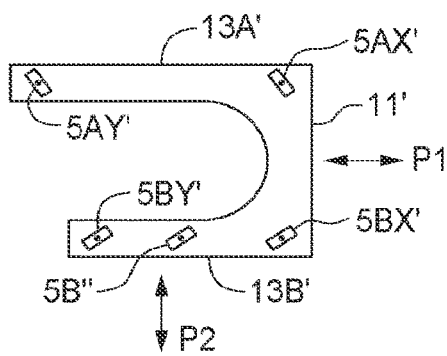
FIG. 21 is a schematic top view of an alternate drive frame with one of the drive wheels offset from the others such that the drive wheels and corresponding wheel axes are not located on the corners of a square or rectangle, and also showing an alternate curved connection of the side beams to the base beam, and further showing an alternate drive wheel mounted at a mid-point of the second side beam which could replace the illustrated two wheels mounted at end portions of the second side beam.

As shown in FIG. 21, where the steering control 9 is operated by a microprocessor 77 as described below, the microprocessor can be programmed to pivot the drive wheels 5 the required degree to follow a desired path even where the wheels 5 are not on the corners of a square or rectangle. In FIG. 21 the second side beam 13B' is shorter than the first side beam 13A' and the wheels 5AX', 5AY', 5BX', 5BY' are located where conventional steering is not possible, however the microprocessor can be programmed to provide the required degree of pivot to each wheel to steer along either path P1 or P2. In various applications it may be desired to locate the wheels at offset locations. FIG. 21 also shows an alternate shape to the drive frame where the first and second side beams 13A', 13B' curve at their inner ends to join the base beam 11" which extra material can strengthen the connection of the beams if desired.

With a substantially rigid drive frame 3 supported on four drive wheels 5, the weight on the wheels will vary as the apparatus 1 passes over uneven ground, and one wheel 5 may be above the ground in some cases. Since all four drive wheels 5 are in fact driven, and since the drive frame 3 will flex to a certain extent, this may be acceptable in many situations with a variety of implement types. FIG. 21 also shows an alternate drive wheel 5B" mounted at a mid-point of the second side beam 13B' which could replace the two wheels 5BX', 5BY' supporting the second side beam 13B' such that the drive frame is supported only on three wheels 5AY', 5AX', and 5B" and all three wheels would then be on the ground at all times Alternatively the apparatus can be configured such that at least one of the drive wheels 5 is movable vertically with respect to the drive frame 3.

Figure 22:
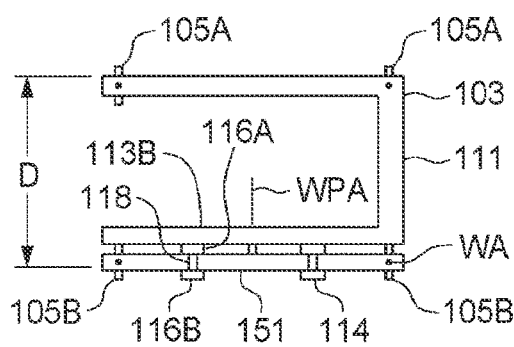
FIG. 22 is a schematic top view of an alternate drive frame with a walking beam mounted along the second side beam.
Figure 23:
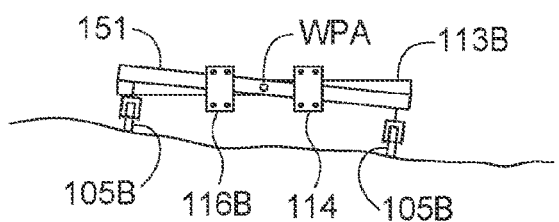
FIG. 23 is a schematic side view of the drive frame with walking beam of FIG. 22 shown travelling along an uneven ground surface.

FIGS. 22 and 23 schematically illustrate a drive frame 103 comprising a walking beam 151 oriented parallel to the second side beam 113B and pivotally attached at a center portion thereof to a center portion of the second side beam 113B at horizontal walking pivot axis WPA. Each of the second pair of drive wheels 105B is mounted to opposite end portions of the walking beam 151 about wheel pivot axes WA. In the illustrated drive frame 103, the base beam 111 has been shortened so that the overall dimension D from the outside edge of the first side beam 113A to the outside edge of the walking beam 151 of the drive frame 103 is the same as in the drive frame 3 described above. In the illustrated drive frame 103 the walking beam 151 is substantially the same length as the second side beam 113B such that the second pair of drive wheels 105B is located at the same location, when the walking beam 151 is aligned with the second side beam 113B, with respect to the first pair of drive wheels 105A as in the drive frame 3 described above such that the same steering is achieved along both paths P1 and P2.

To relieve strain on the walking pivot axis WPA, guide supports 114 are mounted on the second side beam 113B between the walking pivot axis WPA and end portions of the walking beam 151. Each guide support 114 comprises an inner guide plate 116A attached to the second side beam 113B and an outer guide plate 116B attached to the inner guide plate 116A by bolts 118 such that a guide channel is formed between the inner and outer guide plates 116A, 116B and the walking beam 151 moves up and down in the guide channel in close proximity to the inner and outer guide plates 116A, 116B such that forces tending to bend the walking beam 151 with respect to the walking pivot axis WPA are resisted by the inner and outer guide plates 116A, 116B.

Figure 24:
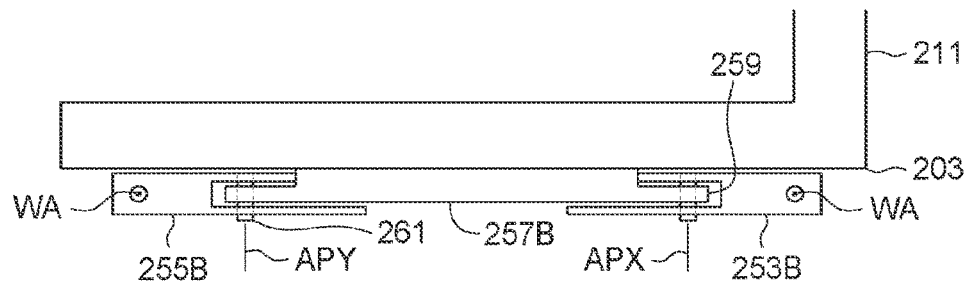
FIG. 24 is a schematic top view of the second side beam of a further alternate drive frame showing the pivot beam attached to the second side beam and base and end arms pivotally attached to tongues extending from ends of the pivot beam.
Figure 25:
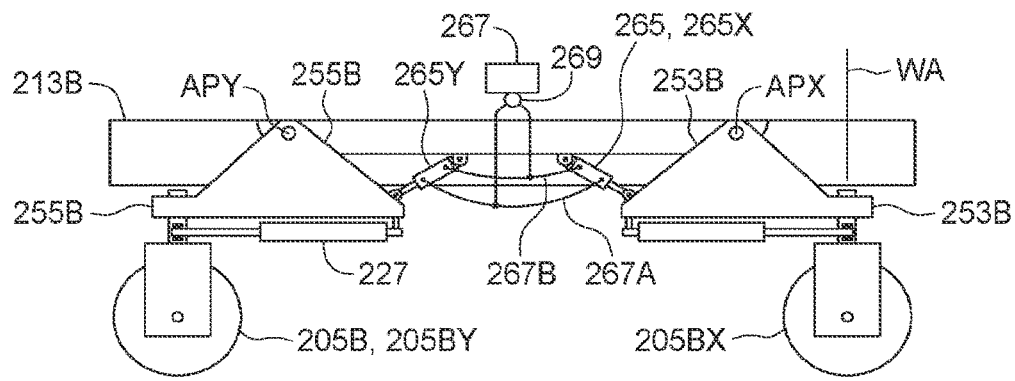
FIG. 25 is a schematic side view of the drive frame of FIG. 23 showing drive wheels and steering hydraulic cylinders mounted on the base and end arms.
Figure 26:
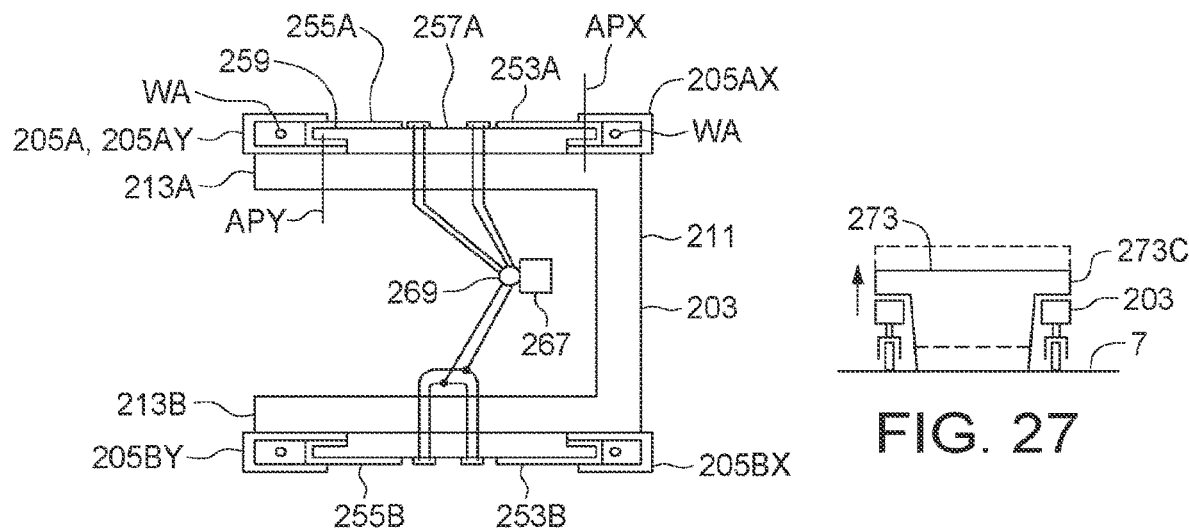
FIG. 26 is a schematic top view of the drive frame of FIGS. 24 and 25 showing the pivot beam and arms mounted on both the first and second side beams.

The walking beam 151 however provides only three point support for the drive frame 103 at the walking pivot axis WPA and the first pair of drive wheels 105A. An alternate arrangement is schematically illustrated in FIGS. 24-26 that provides improved support on all four drive wheels of the drive frame 203.

In the drive frame 203 the second pair of drive wheels 205B comprises a second base drive wheel 205BX pivotally mounted about the corresponding substantially vertical wheel pivot axis WA to a lower portion of a second base arm 253B pivotally attached about horizontal arm pivot axis APX to the second side beam 213B proximate to the base beam 211.

Similarly a second end drive wheel 205BY is pivotally mounted about the corresponding vertical wheel pivot axis to a lower portion of a second end arm 255B pivotally attached about horizontal arm pivot axis APY to the second side beam 213B remote from the base beam 211. The second side beam 213B includes a pivot beam 257B attached to a side of the second side beam 213B as shown in FIG. 23 with pivot tongues 259 extending from each end thereof to provide an pivotal attachment location for a pivot pin 261 extending through each tongue and the corresponding arm 253B, 255B. Hydraulic cylinders 227 are mounted to the arms 253B, 255B for steering control as well.

The second base and end arms 253B, 255B are linked such that when one of the second base and end wheels 205Bx, 205BY pivots up the other of the second base and end wheels pivots down. The drive frame 203 is thus supported by the second pair of wheels 205B at the pivot axes APX, APY, and by the first pair of drive wheels 205A supporting the first side beam 213A. As with the walking beam arrangement described above, the pivot beam 257B and arms 253B, 255B are arranged so that the first pair of drive wheels 205A and the second pair of drive wheels 205B are located at the corners of a rectangle such that steering is conventional along both paths P1 and P2.

FIG. 25 also shows a second base hydraulic cylinder 265X connected between the second base arm 255B and the pivot beam 257B, and a second end hydraulic cylinder 265Y connected between the second end arm 255B and the pivot beam 257B. The hydraulic cylinders 265X, 265Y are connected by fluid conduits 267 such that as the second base arm 253B pivots upward or downward hydraulic fluid flows from the second base hydraulic cylinder 265X into the second end hydraulic cylinder 265Y such that the second end arm 255B moves in a vertical direction opposite the movement of the second base arm 253B.

An advantage of using the hydraulic cylinders 265 is that the elevation of the second side beam 213B can be adjusted by adjusting the length of the hydraulic cylinders 265, such as to ensure for example that on level ground the wheel pivot axes WA are oriented vertically. To adjust the elevation, a pressurized hydraulic fluid source 267 is connected to the second base and end hydraulic cylinders 265 through a hydraulic control valve 269. The hydraulic control valve 269 is operative to direct pressurized hydraulic fluid through conduit 267A into the rod ends of the second base and end hydraulic cylinders 265 to extend the hydraulic cylinders to move the second side beam 213B up, or to direct pressurized hydraulic fluid through conduit 267B into the piston ends of the base and end hydraulic cylinders 265 to retract the hydraulic cylinders to move the second side beam 213B down.

Once the desired vertical position of the second side beam 213A is reached, the valve 269 is closed and hydraulic fluid simply flows back and forth between the hydraulic cylinders 265 as the arms 253B, 255B move up and down, and the side beam 213A will be level when on level ground, and each end thereof will move up and down somewhat as the wheels on each end move correspondingly down and up.

FIG. 26 schematically illustrates the drive frame 203 with a similar arrangement of pivoting arms whereby the first side beam 213A can also be moved up and down. The first pair of drive wheel 205A comprises a first base drive wheel 205AX pivotally mounted about the corresponding vertical wheel pivot axis WA to a lower portion of a first base arm 253A that is pivotally attached about arm pivot axis APA to tongue 259 proximate to the base beam 211 of pivot beam 257A attached to the side of the first side beam 213A. A first end drive wheel 205AY pivotally mounted about the corresponding vertical wheel pivot axis WA to a lower portion of a first end arm 255A pivotally attached about arm pivot axis APA to tongue 259 of the pivot beam 257A remote from the base beam 211.

A first base hydraulic cylinder 271X is connected between the first base arm 253A and the first side beam 213A, and a first end hydraulic cylinder 271Y is connected between the first end arm 255A and the first side beam 213A. It is only desired to move the first side beam 213A up and down in a controlled manner, such as when moving to a lowered implement loading position as schematically illustrated in FIG. 27, however during operation the vertical position of the first pair of drive wheels 205A is typically fixed.

Thus the pressurized hydraulic fluid source 267 is connected to the first base and end hydraulic cylinders through the hydraulic control valve 269 which is operative to direct pressurized hydraulic fluid into the first base and end hydraulic cylinders 271X, 271Y to move the first side beam 213A upward or downward to a desired vertical position, and when the desired vertical position is achieved, the hydraulic control valve 269 is operative to maintain the first base and end arms 253A, 255A in a fixed position.

Figure 27:
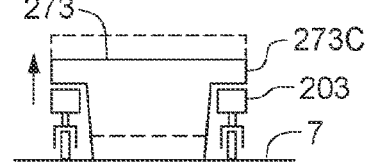
FIG. 27 is a schematic end view of the drive frame of FIG. 26 raising an implement from its idle position to its operating position.

FIG. 27 schematically illustrates an implement 273 in the idle operating position resting on the ground surface 7. The drive frame 203 is shown in a lowered implement loading position with a connecting portion 273C of the implement 273 above the drive frame 203. As described above the hydraulic control valve directs pressurized hydraulic fluid into the hydraulic cylinders 265X, 265Y, 271X, 271Y to move both side beams and thus the drive frame 203 upward to raise the implement 273 to the operating position shown in phantom lines.

Figure 28:
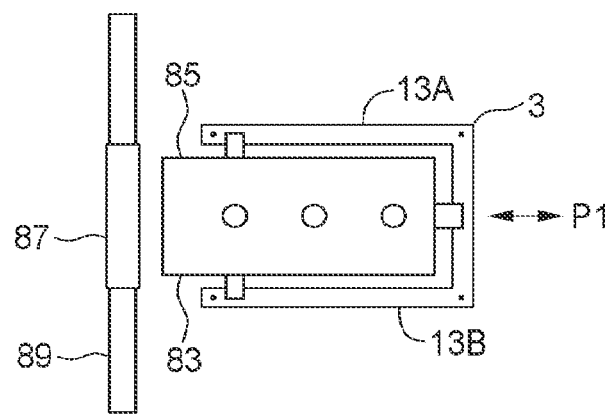
FIG. 28 is a schematic top view of the drive frame of the embodiment of FIG. 1 in the loading position beside a different implement, schematically illustrated as an air seeder with a furrow opener frame comprising folding wings.

FIG. 28 schematically illustrates the drive frame 3 with a different implement 83 in its operating location. The implement 83 in the operating position extends laterally outward beyond the first and second side beams 13A, 13B. The implement 83 is schematically illustrated as an air seeder with tanks 85 supported on the drive frame 3 and a furrow opener frame 87 with folding wings 89. The implement operation of the implement 83 is performed when the drive frame 3 and implement 83 move in an operating direction along travel path P1. The wings 89 fold upward to provide a narrow transport configuration for transport also along the travel path P1. The implement operations will commonly be agricultural operations however it is contemplated that the apparatus 1 could be used in operations in construction, mining and like industries.

Figure 29:
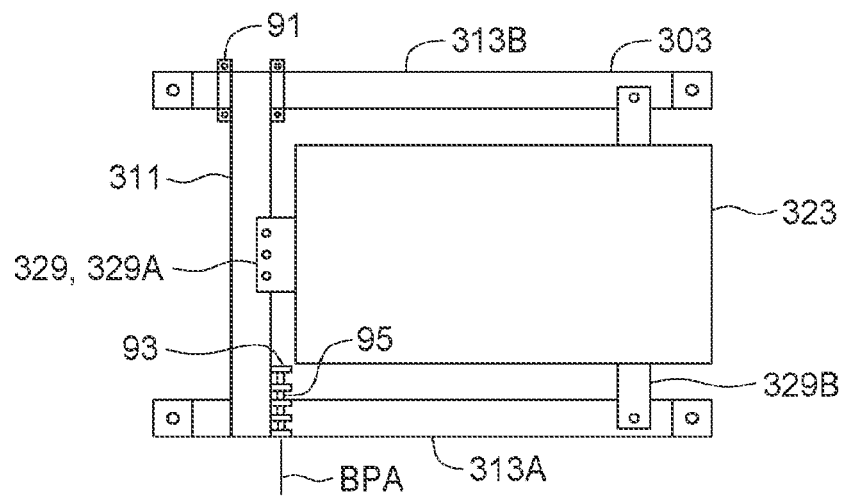
FIG. 29 is a schematic top view of an alternate drive frame and supported implement where the base beam is pivotally attached to the first side beam.
Figure 30:
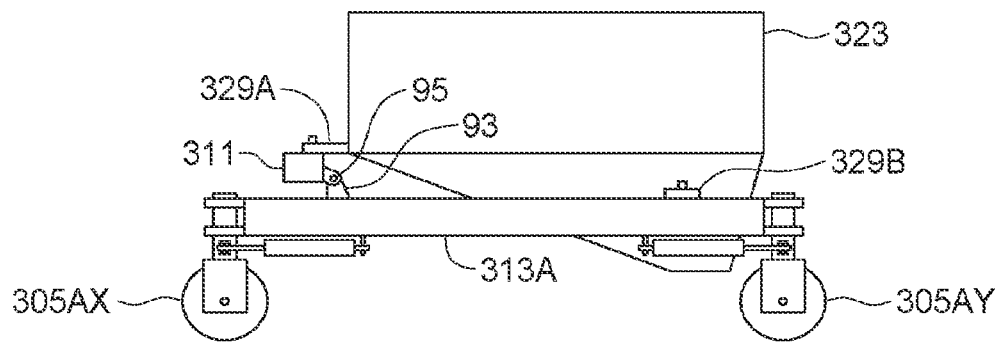
FIG. 30 is a schematic side view of the drive frame and supported implement of FIG. 29.

FIGS. 29 and 30 schematically illustrated a further alternative drive frame 303 where the base beam 311 is pivotally attached to the first side beam 313A about a base pivot axis BPA oriented substantially parallel to the base beam 311 and perpendicular to the first side beam 313A. Here the base beam 311 is above the first and second side beams 313A, 313B. Flanges 91 are welded to the base beam 311 and then bolted to the second side beam 313B. At the opposite end of the base beam 311, cooperating pivot lugs 93 are welded to the base beam 311 and to the side beam 313B and a pin 95 is inserted through holes in the lugs 93 to provide the pivot axis. The lugs 93 are configured to provide some clearance between the base beam 311 and the second side beam 313B. The lugs 93 are made heavy and strong to resist forces encountered during operation and maintain substantially a right angle between the base beam 311 and the second side beam 313B.

Thus in the drive frame 303, the first base and end drive wheels 305AX, 305AY can move up and down. Since the implement 323, here schematically illustrated as a grain tank, is attached to the base beam 311 by tie beam 329A and to the side beams 313A, 313B by tie beams 329B the structure of the drive frame 303 and implement 329 is substantially rigid, however since the beam pivot axis BPA is near the end of the second side beam 313B, the amount of movement is reduced compared to the walking beam arrangement shown in FIG. 23. There is some flex in the rigid beams to accommodate the movement of the second side beam 313B with respect to the base beam 311 and also it is contemplated that the connection of the tie beams 329 to the drive frame 303 can be somewhat loose to allow for the movement.

While it is contemplated that an operator's position can be provided on the drive frame 3, in a typical application the steering control 9, drive control 21, and implement control system 25 are responsive to signals received from a microprocessor 77 that receives location signals from an external guidance system 79 using field maps with global positioning systems or the like to guide and drive the apparatus 1 and to operate implement controls. Typically as well the microprocessor 77 is responsive to wireless signals sent from a remote control box 81 such that a remote operator can monitor and further control the operation of the apparatus 1.

FIGS. 31-38 illustrate an agricultural implement apparatus 401 comprising a U-shaped foundation frame 403 supported on wheels 405 for travel over a ground surface where the foundation frame 403 includes right and left substantially parallel and laterally spaced mounting beams 409R, 409L fixed at inner ends thereof to a substantially horizontal base beam 411 and extending in an outward direction OD from the base beam 411 to outer ends 410 thereof remote from the base beam 411 such that an open implement area 412 is provided between the mounting beams 409 from the outer ends 410 of the mounting beams to the base beam 411. The illustrated foundation frame 403 is self-propelled and includes a motor assembly 408 that provides hydraulic power to drive and steer the wheels 405, and provide any other implement power requirements. For clarity of illustration the motor assembly 408 is not shown in FIGS. 31 and 13.

Figure 31:
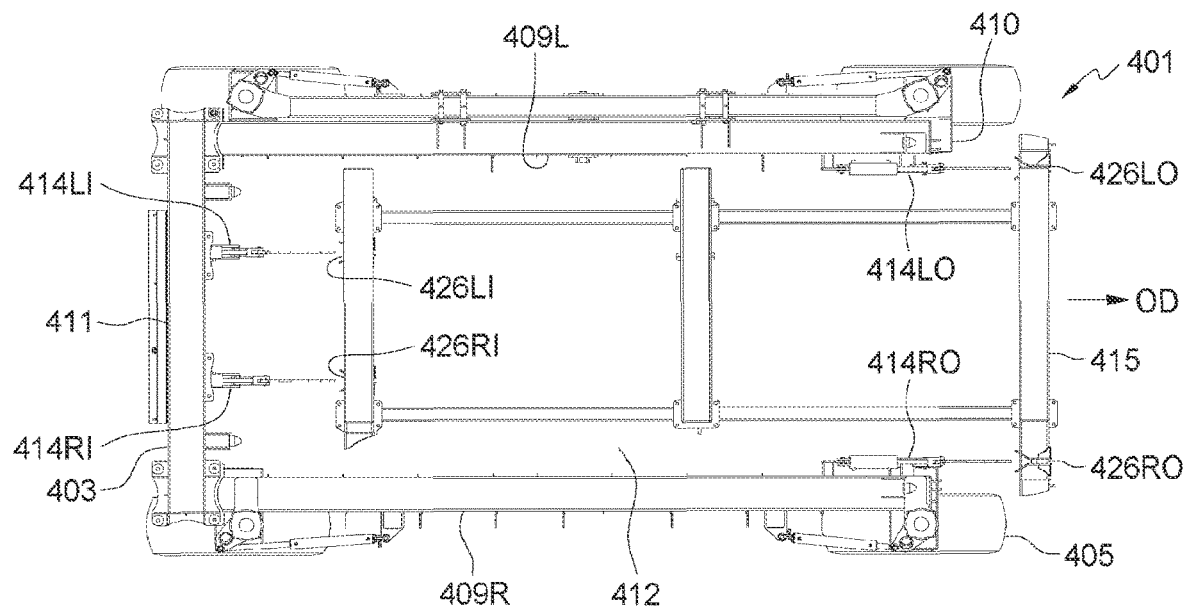
FIG. 31 is a top view of an agricultural implement apparatus comprising a self-propelled foundation frame, with the motor assembly thereof removed, approaching the implement loading position with respect to an implement.
Figure 32:
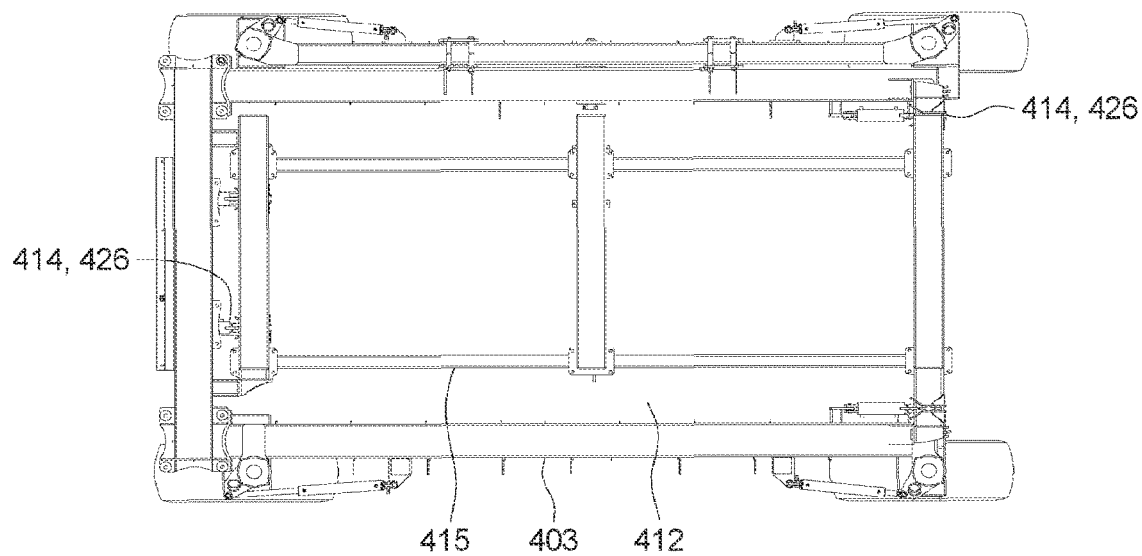
FIG. 32 is a top view of the apparatus of FIG. 12 with the implement mounted on the foundation frame in the operating position.

An implement is configured to perform an agricultural operation such as seeding, cultivating, spraying as described above, and only the implement frame 415 of the implement is illustrated to facilitate viewing the attachment of the implement frame to the foundation frame 403. Also as described above the implement is configured to rest on the ground surface when in an idle position with the frame 415 in an elevated position such that the beam and implement attachment mechanisms 414, 426 are aligned with the foundation frame 403 approaching as illustrated in the top view of FIG. 31 and side view of FIG. 33. The implement frame 415 is configured to attach to the foundation frame 403 in the open implement area 412 when in an operating position as shown in FIGS. 32 and 38.

In the illustrated apparatus 401 four beam attachment mechanisms 414 are mounted to the foundation frame 403. Right and left outer beam attachment mechanisms 414RO, 414LO are mounted to corresponding right and left end portions of the corresponding right and left mounting beams 409R, 409L, and right and left inner beam attachment mechanisms 414RI, 414LI are mounted to the base beam 411.

Corresponding right and left outer implement attachment mechanisms 426RO, 426LO are mounted to the implement 415 at locations corresponding to locations of the right and left outer beam attachment mechanisms 414RO, 414LO, and corresponding right and left inner implement attachment mechanisms 426RI, 426LI are mounted to the implement 415 at locations corresponding to locations of the right and left inner beam attachment mechanisms 414RI, 414LI. The four connections raise the implement 415 up from the idle position in a level orientation and then hold the implement 415 securely to the foundation frame 403.

Each beam attachment mechanism 414 comprises a lift arm 416 pivotally attached at an inner end thereof to the corresponding beam about a lift pivot axis LPA oriented substantially horizontally and perpendicular to the outward direction OD. The lift arms 416 define a hook 418 at the outer ends thereof and are pivotal from a loading position shown in FIGS. 33 and 35 extending in the outward direction OD to an operating position extending upward as shown in FIG. 36. A hydraulic cylinder 420 is operative to pivot the lift arm 416 between the loading position and the operating position and a beam engagement member 422 is operative to engage a corresponding implement engagement member 424 attached to the implement 415.

For each beam attachment mechanism 414, a corresponding implement attachment mechanism 426 is mounted to the implement 415. Each implement attachment mechanism 426 comprises a shaft 428 oriented substantially horizontally and perpendicular to the outward direction OD, and the implement engagement member 424.

Figure 34:
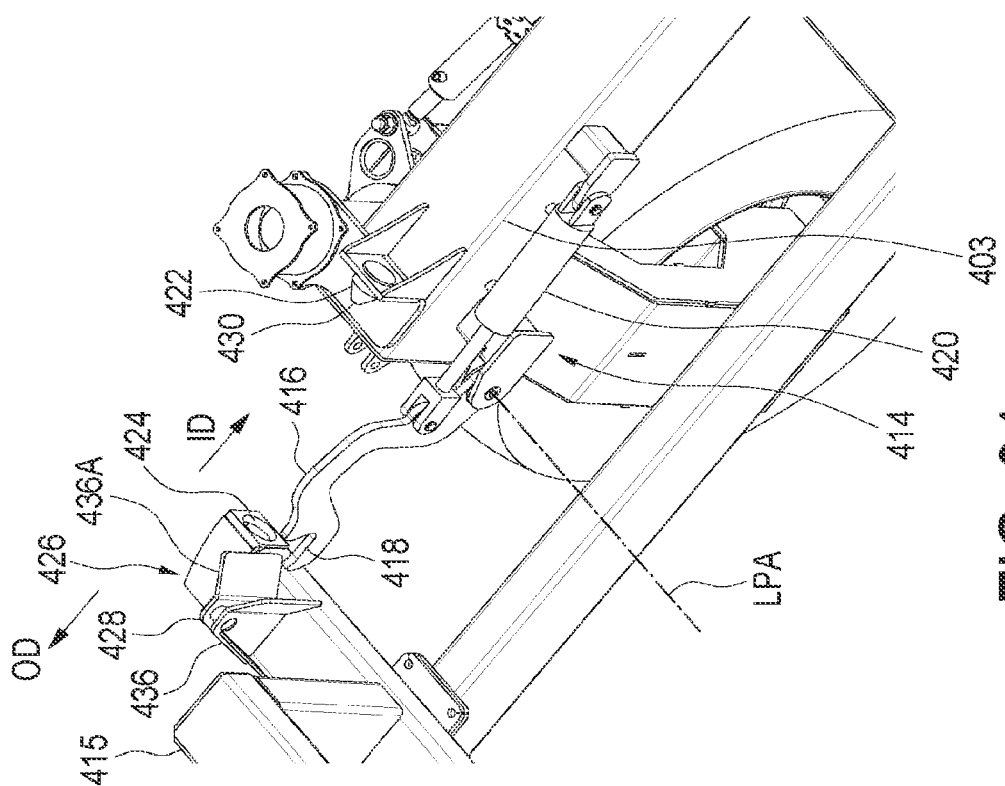
FIG. 34 is a top perspective view of the beam attachment mechanism mounted on the beam of the foundation frame approaching the corresponding implement attachment mechanism mounted on the implement as shown in the side view of FIG. 14.

The attachment mechanisms 414, 426 are configured such that, with the lift arms 416 in the loading position, the foundation frame 403 is movable to an implement loading position with respect to the implement 415 in the idle position where the hook 418 of each beam attachment mechanism 414 is located under the shaft 428 of the corresponding implement attachment mechanism 426. FIGS. 31, 33, and 34 show the lift arm 416 in the loading position approaching the implement attachment mechanisms 426 on the implement 415, and FIG. 33 shows, in phantom lines, the lift arm 416 in the implement loading position with the hook 418 under the shaft 428.

Figure 35:
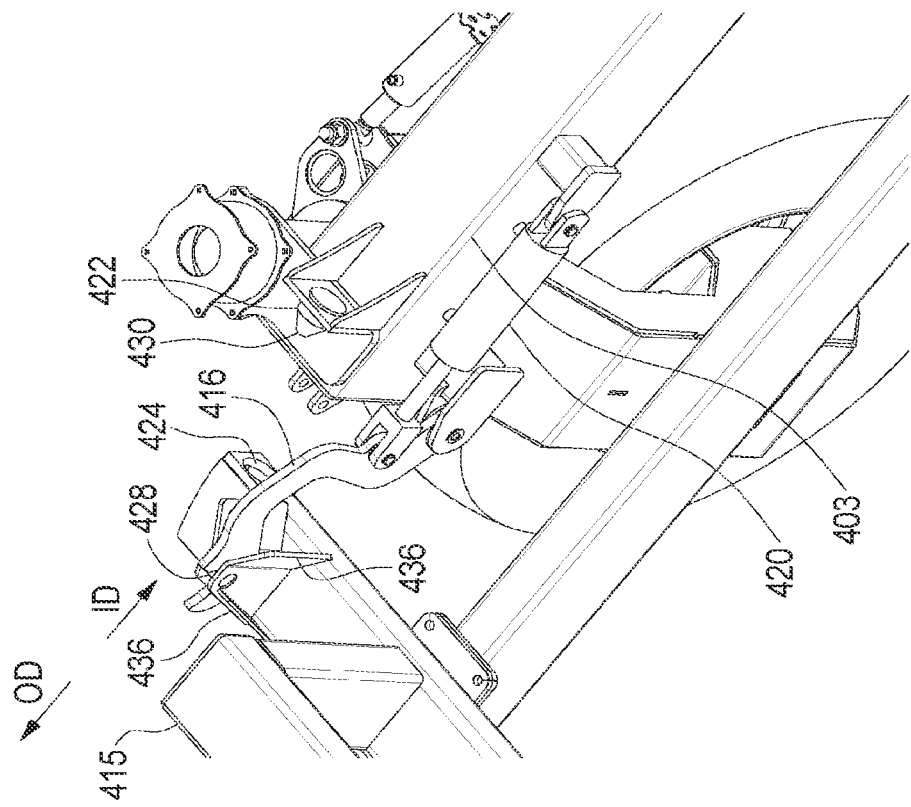
FIG. 35 is a top perspective view of the hook of the lift arm of the beam attachment mechanism shown in FIG. 15 located under the shaft of the corresponding implement attachment mechanism with the lift arm raised from the loading position but not yet in the operating position.

With the foundation frame 403 in the implement loading position, pivoting the lift arms 416 toward the operating position of FIG. 36 moves the implement 415 upward and in an inward direction ID. FIG. 35 shows the lifting arm 416 in an intermediate position partially raised from the loading position of FIG. 34 and the implement 415 raised from its idle position supported on the ground. When the lifting arm 416 reaches the operating position of FIG. 36, each implement engagement member 424 moves into engagement with the corresponding beam engagement member 422 and the implement 415 is fully raised and secured in the operating position as shown in FIGS. 32, 36, and 38.

Removing the implement 415 from the foundation frame 403 and returning same to the idle position supported on the ground is accomplished by activating the hydraulic cylinders 420 in the opposite direction to move the lift arms 416 from the operating position to the loading position which moves the implement 415 forward and downward to the idle position, where the foundation frame 403 and attached beam attachment mechanisms 414 can be moved away from the implement 415 and the corresponding implement attachment mechanisms 426.

In the illustrated apparatus 401 the beam engagement member 422 is provided by a pin configured to slide into the socket that forms the implement engagement member 424. The pin comprises a tapered end 430 operative to guide the pin into the socket. The illustrated pins and sockets are cylindrical such that the pins can rotate in the sockets to allow some flexing of the implement and foundation frame 403 during operation. It is contemplated that the beam engagement member 422 could instead be provided by the socket and the implement engagement member 424 provided by the pin. It is also contemplated that other engagement mechanisms could be used as well.

A hydraulic fluid source 432 of the motor assembly 408 is operative to direct pressurized hydraulic fluid into the hydraulic cylinders 420 to move the lift arms 416 from the loading position to the operating position and operative to exert a bias force BF on the lift arms 416 urging the lift arms 416 toward the operating position as shown in FIG. 36. The hydraulic fluid source 432 directs pressurized hydraulic fluid to the hydraulic cylinders 420 at a pressure selected to exert the desired bias force BF which holds the beam and implement engagement members 422, 424 together in engagement. The engagement supports the implement 415 on the foundation frame 403 and also serves to prevent lateral movement of the right mounting beam 409R with respect to the left mounting beam 409L. Thus if an opposite force F is exerted on the lift arm 416 away from the operating position toward the loading position that is greater than the bias force BF, the lift arm 416 will move away from the operating position toward the loading position and pressurized hydraulic fluid will move out of the hydraulic cylinder 420 and back to hydraulic fluid source 432.

Using the hydraulic cylinders 420 to exert a strong bias force BF toward the operating position allows the lift arms 416 to move slightly in response to sudden forces on the apparatus 401 during operation and then be pushed back into the desired operating position. Such sudden forces can break bolts and like fasteners and this slight movement of the lift arms 416 can relieve the strain on other parts of the apparatus 401 and reduce the occurrence of damage.

Loss of hydraulic pressure is typically sensed and the apparatus 401 powered off to avoid damage. If desired a releasable lock mechanism 434 such as schematically illustrated in FIG. 37 may be provided as well to secure the lift arms 416 in the operating position by securing the implement engagement members 424 in engagement with the corresponding beam engagement members 422. FIG. 37 illustrates a loose engagement which will allow some flexing as discussed with respect to the hydraulic cylinders 420 exerting a bias force BF.

It is contemplated that the hydraulic fluid source could also be configured to conventionally extend and retract the hydraulic cylinders and lock them to keep the lift arms in the operating position with no hydraulic fluid allowed to move in and out as is also known in the art. The lock mechanism 434 would also then maintain the engagement of the beam and implement engagement members 422, 424.

In the illustrated apparatus 401 the shaft 428 on each implement attachment mechanism 426 extends between substantially vertical mounting plates 436. Portions 436A of the mounting plates 436 that are next to the hooks 418 when the foundation frame 403 is moving into the implement loading position, as seen in FIG. 34, slope laterally away from the shaft 428 to guide the corresponding lift arm 416 and corresponding hook 418 toward the shaft 428.

The implement frame 415 can be incorporated into wide variety of implements. The implement mounting system of the apparatus 401 comprising corresponding beam and implement attachment mechanisms 414, 426 provides a secure mounting of the implement 415 to the foundation frame 403 and also provides a simple and effective implement moving mechanism to raise the implement 415 from the idle position supported on the ground to the operating position supported on the foundation frame 403.

The present disclosure provides a method of performing first and second implement operations. The method comprises mounting a drive frame 3 on a plurality of drive wheels 5, each drive wheel 5 pivotally attached to the drive frame about a substantially vertical wheel pivot axis WA; providing a steering control 9 operative to selectively pivot each drive wheel 5 about the corresponding wheel pivot axis; mounting a power source 19 on the drive frame 3 and connecting the power source 19 through a drive control 21 to rotate each drive wheel 5, the drive control 21 operative to selectively rotate the drive wheels 5 in first and second directions; operating the drive control 21 and steering control 9 in a first mode to move and steer the drive frame 3 along a first travel path P1 and operating the drive control 21 and steering control 9 in a second mode to move and steer the drive frame 3 along a second travel path P2 oriented generally perpendicular to the first travel path P1; supporting a first implement, such as seeder 83, configured to perform the first implement operation on a ground surface in a first idle position; supporting a second implement, such as ground working implement 23, configured to perform the second implement operation on a ground surface in a second idle position; operating the drive control 21 and steering control 9 in one of the first and second modes to move and steer the drive frame 3 to an implement loading position with respect to the first implement 83 in the first idle position; connecting the first implement 83 to the drive frame 3 and moving the first implement 83 to an operating position supported by the drive frame 3; connecting the first implement 83 to an implement control system 25 operative to control implement functions; operating the steering and drive controls 9, 21 in the first mode to move and steer the drive frame 3 and first implement 83 along the first travel path P1 and operating the implement control system 25 to control the implement functions of the first implement 83 to perform the first implement operation, such as seeding a field; operating the drive control 21 and steering control 9 in one of the first and second modes to move and steer the drive frame 3 to a storage location and moving the first implement 83 to the idle position and disconnecting the first implement 83 from the drive frame 3 and the implement control system 25; operating the drive control 21 and steering control 9 in one of the first and second modes to move and steer the drive frame 3 to an implement loading position with respect to the second implement 23 in the second idle position; connecting the second implement 23 to the drive frame 3 and moving the second implement 23 to an operating position supported by the drive frame 3; connecting the second implement 23 to the implement control system 25 to control implement functions; operating the steering and drive controls 9, 21 in the second mode to move and steer the drive frame 3 and second implement 23 along the second travel path P2 and operating the implement control system 25 to control the implement functions of the second implement 23 to perform the second implement operation, such as working the field surface.

The implements that can be used with the present apparatus 1 include a wide range including seeding implements, chemical application implements, grain carts, crop swathers and cutters Efficiency is improved as at least some of the weight of the implement, and any product carried in seeder or sprayer tanks is supported by the drive wheels 5 providing ballast such that the drive frame 3 can be lighter and there will still be sufficient weight on the drive wheels to provide the necessary traction. Thus the total amount of weight moved by the power source 19 is reduced. Travel along either path P1 or perpendicular along P2 allows an implement to be operated in a wide orientation along path P2 to cover significant ground area during operation, and then moved in a narrow orientation along path P1 for transport.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement operating apparatus comprising:
   a frame configured for coupling with an implement, the frame includes:
      an implement socket having an open end; and
      wherein the implement socket surrounds an open implement area configured to receive the implement;

a plurality of ground engaging elements coupled with the frame;
a power source in communication with the plurality of ground engaging elements;
an indexing system configured to align the implement relative to the frame, the indexing system includes:
    an indexing projection included in one of the implement or the frame;
    an indexing recess included in the other one of the implement or the frame; and
    the indexing projection is complementary to the indexing recess to facilitate reception of the indexing projection in the indexing recess;
one or more attachment mechanisms, including:
    a beam attachment mechanism coupled with the frame; and
    an implement attachment mechanism coupled with the implement, wherein:
        one or more of the beam attachment mechanism or the implement attachment mechanism are configured to move the implement relative to the frame; and
        the implement attachment mechanism is configured to couple with the beam attachment mechanism, and in a coupled configuration at least one of the beam or implement attachment mechanism moves the implement relative to the frame from a loading position to an operating position; and
    wherein the indexing projection is received by the indexing recess in correspondence with the operating position to align the implement relative to the frame.

2. The apparatus of claim 1, wherein the indexing projection is configured to rotate in the indexing recess.

3. The apparatus of claim 2, wherein rotation of the indexing projection in the indexing recess facilitates flexing of one or more of the implement or the frame.

4. The apparatus of claim 1, wherein the indexing system is configured to transition the frame between decoupled, coupled and secured configurations:
    in the decoupled configuration the indexing projection is separated from the indexing recess;
    in the coupled configuration the indexing projection is movably received in the indexing recess, and the indexing projection is configured to rotate in the indexing recess; and
    in the secured configuration the indexing projection and the indexing recess are locked together with at least one lock mechanism associated with the indexing projection, the at least one lock mechanism different than both of the indexing projection or the indexing recess.

5. The apparatus of claim 4, wherein the secured configuration includes the frame braced with the implement based on the locking of the indexing projection with the indexing recess to permit transmission of forces between the frame and the implement.

6. The apparatus of claim 4, wherein the secured configuration includes the frame braced with the implement based on releasably attaching a tie beam of the implement with the frame, and the tie beam enhances rigidity of the apparatus.

7. The apparatus of claim 1, wherein:
    coupling of the implement with the frame includes securing the implement to the frame;
    reception of the indexing projection in the indexing recess is configured to secure the implement to the frame.

8. The apparatus of claim 7, wherein the indexing projection is configured to engage with the indexing recess and transmit at least a portion of forces exerted on the frame to the implement or to transmit at least a portion of forces exerted on the implement to the frame.

9. The apparatus of claim 1, wherein the frame includes a first side beam and a second side beam.

10. The apparatus of claim 9, further comprising the implement, and the implement has one or more tie beams configured to extend at least between the first beam and the second beam.

11. The apparatus of claim 10, wherein coupling of the implement with the frame includes attaching the one or more tie beams with the first beam and the second beam.

12. The apparatus of claim 11, wherein attaching the one or more tie beams with the first beam and the second beam braces the frame.

13. The apparatus of claim 12, wherein connecting the one or more tie beams with the first beam and the second beam is configured to transmit at least a portion of forces exerted on the first beam to the second beam or to transmit at least a portion of forces exerted on the second beam to the first beam.

14. The apparatus of claim 1, further comprising the implement.

15. The apparatus of claim 14, wherein the indexing projection is included in the implement and the indexing recess is included in the frame.

16. The apparatus of claim 14, wherein the indexing projection is included in the frame and the indexing recess is included in the implement.

17. The apparatus of claim 16, wherein:
    the indexing projection is a beam engagement member; and
    the indexing recess is an implement engagement member.

18. The apparatus of claim 1, further comprising a locking mechanism configured to secure the indexing projection within the indexing recess by maintaining the reception of the indexing projection in the indexing recess.

19. The apparatus of claim 18, wherein:
    the locking mechanism includes a lock member configured for reception in a locking recess; and
    reception of the lock member in the locking recess secures the indexing projection within the indexing recess.

20. The apparatus of claim 19, wherein:
    the indexing projection includes the locking recess; and
    the indexing recess includes the lock member.

21. An implement operating apparatus comprising:
    a frame configured for coupling with an agricultural implement, the frame includes:
        an implement socket having an open end; and
        wherein the implement socket surrounds an open implement area configured to receive the implement;
    a plurality of ground engaging elements coupled with the frame;
    a power source in communication with the plurality of ground engaging elements;
    an indexing system associated with the frame and the implement, the indexing system includes:
        a plurality of indexing projections, including a first indexing projection;
        a plurality of indexing recesses including a first indexing recess; and
        at least one lock mechanism different from the plurality of indexing projections and the plurality of indexing recesses, the at least one lock mechanism configured to lock together the first indexing projection with the first indexing recess; and wherein the indexing system is configured to transition the frame between decoupled, coupled and secured configurations:
in the decoupled configuration the plurality of indexing projections are separated from the plurality of indexing recesses;
in the coupled configuration the plurality of indexing projections are movably received in the plurality of indexing recesses, and the plurality of indexing projections are configured to rotate in the plurality of indexing projections; and
in the secured configuration the plurality of indexing projections and the plurality of indexing recesses are locked together with the at least one lock mechanism;
one or more attachment mechanisms, including:
a beam attachment mechanism coupled with the frame; and
an implement attachment mechanism coupled with the implement, wherein:
one or more of the beam attachment mechanism or the implement attachment mechanism are configured to move the implement relative to the frame; and
the implement attachment mechanism is configured to couple with the beam attachment mechanism, and in a coupled configuration the beam attachment mechanism moves the implement relative to the frame from a loading position to an operating position; and
wherein the indexing projection is received by the indexing recess in correspondence with the operating position to align the implement relative to the frame.

22. The apparatus of claim 21, wherein the secured configuration includes the frame braced with the implement based on the locking of the indexing projection with the indexing recess to permit transmission of forces between the frame and the implement.

23. The apparatus of claim 21, wherein the secured configuration includes the frame braced with the implement based on releasably attaching a tie beam of the implement with the frame, and the tie beam enhances rigidity of the apparatus.

24. The apparatus of claim 23, wherein:
the frame includes a first side beam and a second side beam;
the tie beam extends at least between the first side beam and the second side beam; and
the tie beam is configured to transmit at least a portion of forces exerted on the first side beam to the second side beam or to transmit at least a portion of forces exerted on the second side beam to the first side beam.

25. The apparatus of claim 24, wherein:
the frame includes a base beam extending between the first beam and the second beam; and
the first beam and second beam have a side beam length greater than a length of the base beam.

26. A method of enhancing rigidity of an apparatus operating an implement, the method including:

positioning a frame proximate the implement, the frame configured for coupling with the implement;
inserting an indexing projection into an indexing recess, wherein:
the indexing projection is included in one of the implement or the frame; and
the indexing recess is included in the other one of the implement or the frame;
engaging the indexing projection with an implement engagement member having the indexing recess;
transmitting at least a portion of a first force exerted on the frame to the implement using the indexing projection engaged with the indexing recess, or transmitting at least a portion of a second force exerted on the implement to the frame using the indexing projection engaged with the indexing recess;
moving the implement relative to the frame with one or more attachment mechanisms, including:
coupling an implement attachment mechanism of the implement with a beam attachment mechanism of the frame; and
moving the implement relative to the frame from a loading position to an operating position, wherein the implement is moved relative to the frame using movement of one or more of the beam attachment mechanism or the implement attachment mechanism in correspondence with the implement attachment mechanism coupled with the beam attachment mechanism; and
aligning the implement to the frame using at least the indexing projection received by the indexing recess in correspondence with the operating position.

27. The method of claim 26, further comprising rotating the indexing projection within the indexing recess.

28. The method of claim 26, wherein:
the frame has a first side beam and a second side beam;
the implement has a tie beam configured to extend at least between the first side beam and the second side beam; and
the method further comprises attaching the tie beam of the implement with the first side beam and the second side beam.

29. The method of claim 28, further comprising:
exerting a second force on the first side beam;
transmitting at least a portion of the second force to the second side beam using the tie beam.

30. The method of claim 26, further comprising securing the indexing projection within the indexing recess using a locking mechanism, the locking mechanism different than both of the indexing projection or the indexing recess.

31. The method of claim 30, wherein the locking mechanism is associated with the indexing projection.

32. The method of claim 26, further comprising lifting the implement.

33. The method of claim 32, wherein lifting the implement aligns the indexing projection with the indexing recess.

* * * * *